(12) United States Patent
Allonsius et al.

(10) Patent No.: US 12,439,925 B2
(45) Date of Patent: Oct. 14, 2025

(54) ANTI-PATHOGENIC ACTIVITY OF A BIFUNCTIONAL PEPTIDOGLYCAN/CHITIN HYDROLASE

(71) Applicant: Universiteit Antwerpen, Antwerp (BE)

(72) Inventors: Camille Allonsius, Antwerp (BE); Sarah Lebeer, Mortsel (BE)

(73) Assignee: UNIVERSITEIT ANTWERPEN, Antwerp (BE)

( * ) Notice: Subject to any disclaimer, the term of this patent is extended or adjusted under 35 U.S.C. 154(b) by 213 days.

(21) Appl. No.: 17/285,705

(22) PCT Filed: Oct. 21, 2019

(86) PCT No.: PCT/EP2019/078581
§ 371 (c)(1),
(2) Date: Apr. 15, 2021

(87) PCT Pub. No.: WO2020/079278
PCT Pub. Date: Apr. 23, 2020

(65) Prior Publication Data
US 2022/0000122 A1 Jan. 6, 2022

(30) Foreign Application Priority Data
Oct. 19, 2018 (EP) ................................ 18201637

(51) Int. Cl.
| | | |
|---|---|---|
| A61K 35/747 | (2015.01) | |
| A01N 63/22 | (2020.01) | |
| A01N 63/50 | (2020.01) | |
| A61K 38/16 | (2006.01) | |
| A61K 38/47 | (2006.01) | |

(52) U.S. Cl.
CPC ............. *A01N 63/50* (2020.01); *A01N 63/22* (2020.01); *A61K 38/164* (2013.01); *A61K 38/47* (2013.01); *C12Y 302/01014* (2013.01)

(58) Field of Classification Search
CPC ...... A01N 63/50; A01N 63/22; A61K 38/164; A61K 38/47; C12Y 302/01014
See application file for complete search history.

(56) References Cited

U.S. PATENT DOCUMENTS

| | | |
|---|---|---|
| 2002/0076402 A1 | 6/2002 | Khouri et al. |
| 2004/0022775 A1 | 2/2004 | Reid et al. |

FOREIGN PATENT DOCUMENTS

| | | | |
|---|---|---|---|
| WO | 199217591 A1 | 10/1992 | |
| WO | 2004041305 A1 | 5/2004 | |
| WO | 2010083504 A2 | 7/2010 | |
| WO | 2010129347 A2 | 11/2010 | |

OTHER PUBLICATIONS

Carey et al. Breast Milk Composition After Excercise of Different Intensities; Journal of Human Lactation, vol. 13, No. 2, pp. 115-120. (Year: 1997).*
Ettinger et al. Lactobacillus Rhamnosus GR-1 Attenuates Induction of Hypertrophy in Cardiomyocytes but Not Through Secreted Protein MSP-1 (p75); PLOS One, vol. 12, No. 1, pp. 1-15. (Year: 2017).*
Flatava et al. Human Milk PH is Associated With Fortification, Postpartum Day and Maternal Dietary Intake in Preterm Mother-Infant Dyads; Journal of Perinatology, vol. 43, pp. 60-67. (Year: 2023).*
Jiang et al. Interactions Between Lactobacillus Rhamnosus GG and Oral Micro-Organisms in an In Vitro Biofilm Model; BMC Microbiology, vol. 16, No. 149, pp. 1-11. (Year: 2016).*
Manzoni et al. Use of Lactobacillus Casei Subspecies Rhamnosus GG and Gastrointestinal Colonization by *Candida* Species in Preterm Neonates; Journal of Pediatric Gastroenterology and Nutrition, vol. 45, pp. S190-S194. (Year: 2007).*
Parums et al. Editorial: The World Health Organization (WHO) Fungal Priority Pathogens List in Response to Emerging Fungal Pathogens During the COVID-19 Pandemic; Medical Science Monitor, vol. 28, pp. 1-3. (Year: 2022).*
Segers et al. Towards a Better Understanding of Lactobacillus Rhamnosus GG-Host Interactions; Microbial Cell Factories, vol. 13, Suppl. 1, pp. 1-16. (Year: 2014).*
Rollins, D.M. List of Bacterial Pathogens, downloaded from: https://science.umd.edu/classroom/bsci424/pathogendescriptions/PathogenList.htm on Apr. 24, 2023. (Year: 2000).*
Brand, A. Hyphal Growth in Human Fungal Pathogens and Its Role in Virulence; International Journal of Microbiology, vol. 2012, pp. 1-11. (Year: 2012).*
Ventura et al. Genomics of Actinobacteria: Tracing the Evolutionary History of an Ancient Phylum; Microbiology and Molecular Biology Reviews, vol. 71, No. 3, pp. 495-548. (Year: 2007).*
Noverr et al. Regulation of Candida Albicans Morphogenesis by Fatty Acid Metabolites; Infection and Immunity, vol. 72, No. 11, pp. 6206-6210. (Year: 2004).*
Anonymous. "Isolate." Merriam-Webster.com Dictionary, Merriam-Webster, https://www.merriam-webster.com/dictionary/isolate. Accessed Oct. 17, 2023. (Year: 2023).*
Mukaremera et al. Candida Albicans Yeast, Pseudohyphal, and Hyphal Morphogenesis Differentially Affects Immune Recognition; Frontiers in Immunology, vol. 8, pp. 1-12 (Year: 2017).*

(Continued)

Primary Examiner — Sharmila G Landau
Assistant Examiner — Paul C Martin
(74) Attorney, Agent, or Firm — FRESH IP PLC; Michael H. Anderson

(57) ABSTRACT

The present invention generally relates to the use of a bifunctional peptidoglycan/chitin hydrolase to reduce and/or prevent hyphae formation in a pathogen, and/or to reduce or prevent biofilm formation. The present invention further relates to a bifunctional peptidoglycan/chitin hydrolase for use in the treatment and/or prevention of pathogenic infections, in particular yeast or bacterial infections. In another aspect, the present invention provides the use of a bifunctional peptidoglycan/chitin hydrolase as a anti-pathogenic agent in non-medical applications; in particular in the personal hygiene industry, food industry, cleaning industry, pharma industry, or biocontrol and crop protection industry.

16 Claims, 5 Drawing Sheets

Specification includes a Sequence Listing.

(56) References Cited

OTHER PUBLICATIONS

Nadeem et al. Effect of Growth Media, PH and Temperature on Yeast to Hyphal Transition in Candida Albicans; Open Journal of Medical Microbiology, vol. 3, pp. 185-192. (Year: 2013).*

International Search Report mailed Feb. 26, 2020 in reference to co-pending European Patent Application No. PCT/EP2019/078581 filed Oct. 21, 2019.

Manikandan Muthu, et al: "A Single-Step Purification of Cauliflower Lysozyme and Its Dual Role Against Bactieral and Fungal Plant Pathogets", Applied Biochemistry and Ciotechnology, Humana Press Inc, New York, vol. 177, No. 2, Jul. 25, 2015, pp. 556-566, XP035529482.

Wang S L, et al"Purification and characterization of two bifunctional chitinase/lysozymes extracelulary produced by Pseudomonas aeruginosa [kappa]-87 in a shrimp and crab shell powder medium", Applied and Environmental Microbiology American Sociaty for Microbiology, US, vol. 63, No. 2, Feb. 1, 1997, pp. 380-386, XP009518671.

Seyedhadi Ghasemi et al: "First report of a bifunctional chitinase/ lysozyme produced bySG2", Enzyme and Microbial Technology, Stoneham, Mas, US, vol. 8, No. 3, Nov. 5, 2010, pp. 225-231, XP028138955.

Extended European Search Report in reference to co-pending European Patent Application No. 182016737.8 filed Apr. 4, 2019.

Allonsius Camille N, et al: "Interplay between Lactobacillus rhamnosus GG and Candida and the involvement of exopolysaccharides", Microbial Biotechnology, vol. 10, No. 6, Nov. 2017, pp. 1753-1763, XP009512294.

F. De Seta, et al: "Lactobacillus plantarum P17630 for preventing Candida vadinitis recurrence: a retrospective comparative study", European Journal of Obstetrics & Gynecology and Reproductive Biology, vol. 182, Nov. 1, 2014, pp. 136-139, XP055317398.

Database GNPD, Feb. 9, 2017, anonymous, "Probiotics Chewable Tablets", XP055575981.

Saxeltn, et al: "Fecal recovery following oral administration of Lactobacillus strain GG (ATCC 53103) in gelatine capsules to healthy volunteers", International Journal of Food Microbiology, Elssevier BV, NL, vol. 25, No. 2, a Apr. 1995, pp. 199-203, XP009512304.

Chen, et al., "Carbohydrate-binding motif in chitinase 3-like 1 (CHI3L1/YKL-40) specifically activates Aky signaling pathway in colonic epithelial cells", Clinical Immunology, vol. 140, pp. 268-275, 2011.

Claes, et al., "Lessons from probiotic-host interaction studies in murine models of experimental colitis", Mol. Nutr. Food Res., vol. 55, pp. 1441-1453, 2011.

Claes, et al., "Genetic and Biochemical Characterization of the Cell Wall Hydrolase Activity of the Major Secreted Protein of Lactobacillus rhamnosus GG", PLOS One, vol. 7, Issue 2, pp. 1-8, Feb. 2012.

Ettinger, et al., "Lactobacillus rhamnosus GR-1 Attenuates Induction of Hypertrophy in Cardiomyocytes but Not through Secreted Protein MSP-1 (p75)", PLOS One, pp. 1-15, Jan. 13, 2017.

Könönen, et al., "Actinomyces and Related Organisms in Human Infections", Clinical Microbiology Reviews, vol. 28, No. 2, pp. 419-442, Apr. 2015.

Lebeer, et al., "The major secreted protein Msp1/p75 is O-glycosylated in Lactobacillus rhamnosus GG", Microbial Cell Factories, vol. 11, No. 15, pp. 1-14, 2012.

Lewis, "Multidrug Tolerance of Biofilms and Persister Cells", T. Romeo (ed.), Bacterial Biofilms, Current Topics in Microbiology and Immunology 322, pp. 107-131, 2008.

Low, et al., "Chitinase 3-like 1 induces survival and proliferation of intestinal epithelial cells during chronic Inflammation and colitis-associated cancer by regulating S100A9", Oncotarget, vol. 6, No. 34, pp. 36535-36550, 2015.

Olland, et al., "Triad of polar residues implicated in pH specificity of acidic mammalian chitinase", Protein Science, vol. 18, pp. 569-578, 2009.

Perrakis, et al., "Crystal structure of a bacterial chitinase at 2.3 A resolution", Current Biology Ltd., vol. 2, No. 12, pp. 1169-1180, 1994.

Petrova, et al., "Lectin-Like Molecules of Lactobacillus rhamnosus GG Inhibit Pathogenic *Escherichia coli* and *Salmonella* Biofilm Formation", PLOS One, pp. 1-24, Aug. 18, 2016.

Tian, et al., "Molecular Basis for the Structural Stability of an Enclosed B-Barrel Loop", Journal of Molecular Biology, ScienceDirect, vol. 402, pp. 475-489, 2010.

Yachdav, et al., "PredictProtein—an open resource for online prediction of protein structural and functional features", Nucleic Acids Research, vol. 42, pp. W337-W343, 2014.

Yan, et al., "Probiotic Bacterium Prevents Cytokine-induced Apoptosis in Intestinal Epithelial Cells", The Journal of Biological Chemistry, vol. 277, No. 52, pp. 50959-50965, 2002.

Aleksandrzak-Piekarczyk, et. al., "Genome Sequence of the Probiotic Strain Lactobacillus rhamnosus", formerly known as: 2-hydroxy-6-oxo-6-phenylhexa-2,4-dienoate hydrolase [Lacticaseibacillus rhamnosus LOCK900], Genome Announe, Version AGP70157.1, Jan. 30, 2014.

Aleksandrzak-Piekarczyk, et. al., "Genome Sequence of the Probiotic Strain Lactobacillus rhamnosus", Microbial Biochemistry Institute of Biochemistry and Biophysics, vol. 1, No. 4, Apr. 2013.

* cited by examiner

SEQUENCE LISTING

```
<160> NUMBER OF SEQ ID NOS: 4

<210> SEQ ID NO 1
<211> LENGTH: 498
<212> TYPE: PRT
<213> ORGANISM: Artificial Sequence
<220> FEATURE:
<223> OTHER INFORMATION: Msp1 protein

<400> SEQUENCE: 1

Met Val Asp Ser Lys Lys Val Leu Ser Val Thr Ala Gly Phe Val Gly
1               5                   10                  15

Ala Ala Gly Leu Ala Ala Leu Ala Thr Gly Ala Asn Thr Val Ser Ala
            20                  25                  30

Ser Thr Gly Thr Val Ser Tyr Lys Ser Gly Ala Thr Thr Val Trp Asn
        35                  40                  45

Ser Pro Ser Trp His Gln Val Lys Arg Tyr Val Thr Phe Gly Asp Thr
    50                  55                  60

Val Gln Leu Leu Gly Lys Thr Val Asp Gln Asn Gly Ala Thr Trp Tyr
65                  70                  75                  80

Lys Val Gly Asp Asn Gln Trp Ile Pro Glu Leu Tyr Leu Asn Val Ala
                85                  90                  95

Gly Lys Thr Ala Thr Val Glu Thr Pro Ser Ser Ala Ala Ser Gln Thr
            100                 105                 110

Ala Val Ser Gln Ala Pro Ala Ser Gln Ala Pro Thr Ser Gln Ala Pro
        115                 120                 125

Ala Thr Gln Thr Pro Ala Ala Pro Gln Thr Asp Thr Gln Thr Ala Asn
    130                 135                 140

Thr Gln Leu Tyr Val Lys Asn Ile Gly Ser Ala Val Thr Val Trp Thr
145                 150                 155                 160

Thr Pro Ala Tyr Thr His Ala Thr Gly Gln Tyr Leu Glu Gly Ser Gln
                165                 170                 175

Thr Leu Thr Ala Val Ala Gln Gln Ala Asn Gly Glu Thr Trp Tyr
            180                 185                 190

Arg Leu Ala Asn Gly Gly Tyr Val Pro Ala Arg Phe Val Ser Thr Thr
        195                 200                 205

Pro Val Ala Val Thr Pro Gln Pro Ala Ala Pro Gln Ser Asn Glu Ala
    210                 215                 220

Ser Val Ala Ser Thr Asn Thr Asn Ala Ala Asn Asp Ser Ala Ala Ala
225                 230                 235                 240

Ser Ser Ala Ala Ala Ser Gln Ala Ala Ala Ser Ser Ala Ala Ala Ser
                245                 250                 255
```

-continued

Thr Ala Ala Ala Asn Ala Ala Val Ala Ser Ala Asn Ala Thr Ala Ser
                260                 265                 270

Gln Ala Ala Ala Ser Glu Ala Ala Ser Gln Ala Ala Ala Ser Gln
            275                 280                 285

Ala Ala Ala Ser Gln Ala Ala Ala Ser Gln Ala Ala Ser Gln Ala
        290                 295                 300

Ala Ala Ser Gln Ala Ala Ser Gln Ala Ala Ser Gln Ala Ala
305                 310                 315                 320

Ala Ser Gln Ala Ala Ser Gln Ala Ala Asn Ala Ala Gln Gln
                325                 330                 335

Ala Pro Ala Asn Gln Ala Asn Val Thr Thr Thr Gln Val Asn Ala Asn
            340                 345                 350

Gln Ala Gln Gln Gln Thr Ala Thr Ala Thr Pro Ala Val Asn Thr Ser
        355                 360                 365

Asn Gln Thr Ala Ala Val Ser Ala Ser Arg Gln Ala Lys Ile Gln Ala
370                 375                 380

Val Ile Ala Ile Ala Glu Gln Gln Val Gly Lys Pro Tyr Val Trp Gly
385                 390                 395                 400

Gly Lys Gly Pro Asn Ser Phe Asp Cys Ser Gly Leu Met Tyr Tyr Ala
                405                 410                 415

Phe Leu Asn Gly Ala Gly Val Asn Ile Gly Gly Trp Thr Val Pro Gln
            420                 425                 430

Glu Ser Ser Gly Thr Gln Val Ser Leu Ser Ala Leu Gln Pro Gly Asp
        435                 440                 445

Leu Leu Phe Trp Gly Ser His Gly Ser Thr Tyr His Val Ala Leu Tyr
    450                 455                 460

Ile Gly Gly Gly Thr Met Ile Gln Ala Pro Gln Pro Gly Glu Asn Val
465                 470                 475                 480

Lys Tyr Thr Ala Leu Ala Tyr Phe Met Pro Asp Phe Ala Val Arg Pro
                485                 490                 495

Ser Leu

<210> SEQ ID NO 2
<211> LENGTH: 1498
<212> TYPE: DNA
<213> ORGANISM: Artificial Sequence
<220> FEATURE:
<223> OTHER INFORMATION: Msp1 gene

<400> SEQUENCE: 2
atggtagatt ctaagaaagt attgtcagta acggcaggct tcgttggtgc tgccggtctg      60
gcggctttag caaccggagc caataccgtt tctgcatcga cagggacggt cagttacaaa     120
tccggtgcga ccaccgtatg gaatagtcca tcatggcacc aagtcaaacg ctacgtgact     180
tttggggaca cggtgcagct attgggtaaa accgttgacc aaaatggtgc tacttggtat     240
aaagttggcg acaatcagtg gattccggaa ttgtatttga atgttgcggg taaaactgcc     300
acggttgaaa caccgagttc ggcagcaagt caaactgctg tcagccaagc accggctagt     360
caggcgccta caagccaagc accagcaacc caaacacctg cdagcaccac aaaccgatac     420
ccaaacagct aatacacagc tttatgtcaa gaatatcggt tcagcagtta ccgtatggac     480
aaccccggcg tatactcatg cgacaggtca atatctagaa ggcagccaga cactgacggc     540
tgttgcccag cagcaagcaa atggtgaaac atggtatcgg cttgccaacg gcggttatgt     600
tcctgcacgg tttgttagca caacaccagt ggctgtaaca ccacaacctg cagcgccaca     660

```
gtcaaatgag gccagtgttg cgtcaacgaa caccaatgca gctaatgatt ctgccgctgc    720
ttctagtgca gccgcatcgc aagccgcagc ttccagtgct gccgcttcta cagcagcagc    780
taatgcagca gtagcatctg caaatgccac tgcatcacaa gcagcggctt ctgaagctgc    840
tgcatctcag gcggctgcat cacaagccgc agcgtctcag gctgccgcat cgcaagccgc    900
agcatcacaa gctgcagcgt ctcaggcggc tgcatcacaa gccgccgctt cacaagctgc    960
agcgtcccag gctgccgcat cacaagcagc tgcaaatgct gcccagcagg cgccggctaa   1020
ccaggcaaat gttacaacaa cacaggttaa tgccaatcaa gctcaacagc aaaccgctac   1080
ggctacacca gcagttaaca cgtctaatca gacggcggcc gtaagtgctt caagacaggc   1140
caagattcaa gcagtgattg ccattgccga acaacaagtt ggtaagccat acgtttgggg   1200
cggtaagggg cctaacagct ttgattgctc cggtttgatg tattacgctt tcctgaatgg   1260
cgctggcgtc aacattggtg gctggacagt tcctcaagaa tcttcaggga cacaagtttc   1320
actgagtgct ctgcaacccg gtgacttact cttctggggt agtcacggtt caacctatca   1380
cgttgccctg tacatcggtg gcggcacgat gattcaggcg ccacagccag gtgaaaatgt   1440
taaatatacc gcgctggcat acttcatgcc tgactttgcg gttcgcccgt cactataa    1498
```

<210> SEQ ID NO 3  
<211> LENGTH: 217  
<212> TYPE: PRT  
<213> ORGANISM: Artificial Sequence  
<220> FEATURE:  
<223> OTHER INFORMATION: Msp1 protein - chitinase domain

<400> SEQUENCE: 3

```
Met Val Asp Ser Lys Lys Val Leu Ser Val Thr Ala Gly Phe Val Gly
1               5                   10                  15

Ala Ala Gly Leu Ala Ala Leu Ala Thr Gly Ala Asn Thr Val Ser Ala
            20                  25                  30

Ser Thr Gly Thr Val Ser Tyr Lys Ser Gly Ala Thr Thr Val Trp Asn
        35                  40                  45

Ser Pro Ser Trp His Gln Val Lys Arg Tyr Val Thr Phe Gly Asp Thr
    50                  55                  60

Val Gln Leu Leu Gly Lys Thr Val Asp Gln Asn Gly Ala Thr Trp Tyr
65                  70                  75                  80

Lys Val Gly Asp Asn Gln Trp Ile Pro Glu Leu Tyr Leu Asn Val Ala
                85                  90                  95

Gly Lys Thr Ala Thr Val Glu Thr Pro Ser Ser Ala Ala Ser Gln Thr
            100                 105                 110

Ala Val Ser Gln Ala Pro Ala Ser Gln Ala Pro Thr Ser Gln Ala Pro
        115                 120                 125

Ala Thr Gln Thr Pro Ala Ala Pro Gln Thr Asp Gln Thr Ala Asn
        130                 135                 140

Thr Gln Leu Tyr Val Lys Asn Ile Gly Ser Ala Val Thr Val Trp Thr
145                 150                 155                 160

Thr Pro Ala Tyr Thr His Ala Thr Gly Gln Tyr Leu Glu Gly Ser Gln
                165                 170                 175

Thr Leu Thr Ala Val Ala Gln Gln Gln Ala Asn Gly Glu Thr Trp Tyr
            180                 185                 190

Arg Leu Ala Asn Gly Gly Tyr Val Pro Ala Arg Phe Val Ser Thr Thr
        195                 200                 205

Pro Val Ala Val Thr Pro Gln Pro Ala
    210                 215
```

<210> SEQ ID NO 4
<211> LENGTH: 651
<212> TYPE: PRT
<213> ORGANISM: Artificial Sequence
<220> FEATURE:
<223> OTHER INFORMATION: Msp1 gene - chitinase domain

<400> SEQUENCE: 4

```
Ala Thr Gly Gly Thr Ala Gly Ala Thr Cys Thr Ala Ala Gly Ala
1               5                   10                  15

Ala Ala Gly Thr Ala Thr Thr Gly Thr Cys Ala Gly Thr Ala Ala Cys
                20                  25                  30

Gly Gly Cys Ala Gly Gly Cys Thr Thr Cys Gly Thr Thr Gly Gly Thr
                35                  40                  45

Gly Cys Thr Gly Cys Cys Gly Cys Thr Gly Gly Cys Gly Gly
        50                  55                  60

Cys Thr Thr Thr Ala Gly Cys Ala Ala Cys Cys Gly Gly Ala Gly Cys
65                  70                  75                  80

Cys Ala Ala Thr Ala Cys Cys Gly Thr Thr Thr Cys Thr Gly Cys Ala
                85                  90                  95

Thr Cys Gly Ala Cys Ala Gly Gly Ala Cys Gly Gly Thr Cys Ala
                100                 105                 110

Gly Thr Thr Ala Cys Ala Ala Ala Thr Cys Cys Gly Thr Gly Cys
                115                 120                 125

Gly Ala Cys Cys Ala Cys Cys Gly Thr Ala Thr Gly Gly Ala Ala Thr
                130                 135                 140

Ala Gly Thr Cys Cys Ala Thr Cys Ala Thr Gly Gly Cys Ala Cys Cys
145                 150                 155                 160

Ala Ala Gly Thr Cys Ala Ala Cys Gly Cys Thr Ala Cys Gly Thr
                165                 170                 175

Gly Ala Cys Thr Thr Thr Thr Gly Gly Gly Gly Ala Cys Ala Cys Gly
                180                 185                 190

Gly Thr Gly Cys Ala Gly Cys Thr Ala Thr Thr Gly Gly Gly Thr Ala
                195                 200                 205

Ala Ala Ala Cys Cys Gly Thr Thr Gly Ala Cys Cys Ala Ala Ala
                210                 215                 220

Thr Gly Gly Thr Gly Cys Thr Ala Cys Thr Thr Gly Gly Thr Ala Thr
225                 230                 235                 240

Ala Ala Ala Gly Thr Thr Gly Gly Cys Gly Ala Cys Ala Ala Thr Cys
                245                 250                 255

Ala Gly Thr Gly Gly Ala Thr Thr Cys Cys Gly Gly Ala Ala Thr Thr
                260                 265                 270

Gly Thr Ala Thr Thr Thr Gly Ala Thr Gly Thr Thr Gly Cys Gly
                275                 280                 285

Gly Gly Thr Ala Ala Ala Cys Thr Gly Cys Cys Ala Cys Gly Gly
                290                 295                 300

Thr Thr Gly Ala Ala Ala Cys Ala Cys Cys Gly Ala Gly Thr Thr Cys
305                 310                 315                 320

Gly Gly Cys Ala Gly Cys Ala Ala Gly Thr Cys Ala Ala Ala Cys Thr
                325                 330                 335

Gly Cys Thr Gly Thr Cys Ala Gly Cys Cys Ala Ala Gly Cys Ala Cys
                340                 345                 350

Cys Gly Gly Cys Thr Ala Gly Thr Cys Ala Gly Gly Cys Gly Cys Cys
                355                 360                 365
```

```
Thr Ala Cys Ala Ala Gly Cys Cys Ala Ala Gly Cys Ala Cys Cys Ala
    370                 375                 380
Gly Cys Ala Ala Cys Cys Ala Ala Ala Cys Ala Cys Cys Thr Gly
385                 390                 395                 400
Cys Ala Gly Cys Ala Cys Cys Ala Cys Ala Ala Ala Cys Cys Gly Ala
            405                 410                 415
Thr Ala Cys Cys Cys Ala Ala Ala Cys Ala Gly Cys Thr Ala Ala Thr
            420                 425                 430
Ala Cys Ala Cys Ala Gly Cys Thr Thr Thr Ala Thr Gly Thr Cys Ala
        435                 440                 445
Ala Gly Ala Ala Thr Ala Thr Cys Gly Gly Thr Thr Cys Ala Gly Cys
    450                 455                 460
Ala Gly Thr Thr Ala Cys Cys Gly Thr Ala Thr Gly Gly Ala Cys Ala
465                 470                 475                 480
Ala Cys Cys Cys Cys Gly Gly Cys Gly Thr Ala Thr Ala Cys Thr Cys
            485                 490                 495
Ala Thr Gly Cys Gly Ala Cys Ala Gly Gly Thr Cys Ala Ala Thr Ala
            500                 505                 510
Thr Cys Thr Ala Gly Ala Ala Gly Gly Cys Ala Gly Cys Cys Ala Gly
        515                 520                 525
Ala Cys Ala Cys Thr Gly Ala Cys Gly Gly Cys Thr Gly Thr Thr Gly
        530                 535                 540
Cys Cys Cys Ala Gly Cys Ala Gly Cys Ala Ala Gly Cys Ala Ala Ala
545                 550                 555                 560
Thr Gly Gly Thr Gly Ala Ala Ala Cys Ala Thr Gly Gly Thr Ala Thr
            565                 570                 575
Cys Gly Gly Cys Thr Thr Gly Cys Cys Ala Ala Cys Gly Gly Cys Gly
            580                 585                 590
Gly Thr Thr Ala Thr Gly Thr Thr Cys Cys Thr Gly Cys Ala Cys Gly
        595                 600                 605
Gly Thr Thr Thr Gly Thr Thr Ala Gly Cys Ala Cys Ala Ala Cys Ala
        610                 615                 620
Cys Cys Ala Gly Thr Gly Gly Cys Thr Gly Thr Ala Ala Cys Ala Cys
625                 630                 635                 640
Cys Ala Cys Ala Ala Cys Cys Thr Gly Cys Ala
            645                 650
```

ANTI-PATHOGENIC ACTIVITY OF A BIFUNCTIONAL PEPTIDOGLYCAN/CHITIN HYDROLASE

CROSS-REFERENCE TO RELATED APPLICATIONS

This application is a § 371 National Phase Entry of PCT/EP2019/078581, filed Oct. 21, 2019, which claims priority to EP18201637.8, filed Oct. 19, 2018, each of which is incorporated herein by reference in its entirety.

FIELD OF THE INVENTION

The present invention relates to the use of a bifunctional peptidoglycan/chitin hydrolase to reduce and/or prevent hyphae formation in a pathogen, such as a yeast or bacterium.

The present invention further relates to a bifunctional peptidoglycan/chitin hydrolase for use in human an veterinary medicine, in particular for use in the treatment and/or prevention of pathogenic infections, in particular yeast or bacterial infections.

BACKGROUND TO THE INVENTION

Fungal and bacterial pathogens are more commonly associated with morbidity and mortality than generally appreciated. One of the most common fungal pathogens in humans is *Candida albicans* (*C. albicans*), causing both superficial mucosal candidiasis and life-threatening invasive infections. Under normal circumstances, *C. albicans* lives as a commensal on human mucosal surfaces, but can shift to a pathogenic lifestyle after fungal adhesion and overgrowth, followed by tissue invasion and mucosal infection. Similarly, fungal infections of plants and crops, such as *Botrytis*, *Sclerotinia* and *Fusarium* can have devastating effects in agriculture. An important factor in the process of fungal pathogenesis is the formation of filamentous hyphae which contribute to adhesion and invasion of host cells. This process of hyphal morphogenesis implies the reversible transition between unicellular yeast cells and the filamentous hyphal growth form. Compared to the cell wall of unhyphenised yeast cells, the hyphal cell wall is more rigid due to higher levels of chitin and is decorated with other (glyco) proteins. The hyphal form of pathogens may be important for penetrating tissue surfaces and for escaping from host cells following internalization. It was suggested that hyphae produce mechanical force aiding penetration of the host epidermis. In order for mechanical force to be exerted on the host cell tissue surface, tight anchorage to host tissue is probably a prerequisite.

Further, hyphal formation is the first step in biofilm formation by fungal pathogens. The formation of biofilm involves the adhesion of planktonic cells (adhesion phase), cell growth and aggregation (initial colonization phase), production of extracellular material and the eventual development of a mature biofilm matrix (maturation phase). Biofilm formation is an important virulence attribute of fungal pathogens such as *Candida* spp., as the biofilm cells exhibit greater resistance to antifungals and host defenses compared to their planktonic or suspended counterparts. This is partially caused by the production of the exopolymeric matrix that restricts penetration of antifungal drugs through the biofilm, together with an increased formation of persistors cells (Lewis, 2008).

Fungal infections, such as for example *Candida* infections, are traditionally treated with antifungal compounds such as azoles, but resistance to azoles is rising and worrisome. In recent years, the concept of targeting virulence factors instead of pathogen viability has become increasingly popular. The shift of *C. albicans* to hyphal growth is a prime example of such virulence process to target. In addition, this shift has been linked to disturbances in the human microbiota and a decreased ability of the commensal microbiota to control *Candida* infections. Because of this key role of the commensal microbiota, the potential of probiotics such as lactobacilli to remodel the microbiota is increasingly explored for application in the vaginal tract, the oral cavity of elderly, and the gastro-intestinal tract of preterm neonates and children. Several clinical trials have shown promising protective effects of members of the *Lactobacillus* genus complex, but the results of other clinical studies were inconclusive. The interpretation of differences between clinical studies is hampered by the lack of knowledge on the molecular mechanisms of action underlying the inhibitory effects on *C. albicans* of lactobacilli.

In the present invention, it was surprisingly found that a bifunctional peptidoglycan/chitin hydrolase, for example produced by a strain of the *Lactobacillus casei* group, is able to reduce and/or prevent hyphae formation in a pathogen such as *C. albicans*, and thereby can be used as antipathogenic agent.

SUMMARY OF THE INVENTION

The present invention is based on the identification of a bifunctional peptidoglycan/chitin hydrolase that has the capacity to reduce and/or prevent hyphae formation in a pathogen. Therefore, in a first embodiment, the present invention provides the use of a bifunctional peptidoglycan/chitin hydrolase to reduce and/or prevent hyphae formation in a pathogen. In another embodiment, the use of said bifunctional peptidoglycan/chitin hydrolase to reduce and/or prevent hyphen formation in a pathogen is disclosed, wherein the bifunctional peptidoglycan/chitin hydrolase is present in a composition.

In a further embodiment, the use of the bifunctional peptidoglycan/chitin hydrolase according to all the different embodiments of the invention is provided in an environment with a pH lower than 7. In another embodiment, said use is provided in a micro-environment with a pH lower than 7. In a further embodiment, and when the use of the bifunctional peptidoglycan/chitin hydrolase is provided in a composition, said composition has a pH of less than 7. In another embodiment, said composition further comprises an acid; in particular a lactic acid.

In a further aspect, the present disclosure provides the use of a bifunctional peptidoglycan/chitin hydrolase or a composition comprising said hydrolase to reduce and/or prevent hyphae formation as an anti-pathogenic agent in non-medical applications; in particular as an anti-fungal agent in non-medical applications. For example, the use of a bifunctional peptidoglycan/chitin hydrolase is provided as an anti-pathogenic agent in personal hygiene industry, food industry, cleaning industry, pharma industry, plant protection or biocontrol industry. In a further embodiment, the use of a bifunctional peptidoglycan/chitin hydrolase is provided as an anti-fungal agent in personal hygiene industry, food industry, cleaning industry, pharma industry or biocontrol industry. In an even further embodiment, the present invention provides the use of a bifunctional peptidoglycan/chitin hydrolase according to the different embodiments of the invention, as a biocontrol agent.

In all said embodiments, the bifunctional peptidoglycan/chitin hydrolase can also be present in a composition. In a further embodiment, said composition comprises the bifunctional peptidoglycan/chitin hydrolase and a *Lactobacillus* strain; in particular a *Lactobacillus* strain selected from the group comprising *Lactobacillus fermentum, Lactobacillus rhamnosus, Lactobacillus casei, Lactobacillus paracasei*.

In another embodiment, the present disclosure provides the use of a bifunctional peptidoglycan/chitin hydrolase according to all the different embodiments of the invention to reduce and/or prevent hyphae formation in a pathogen, thereby reducing and/or preventing the formation of a biofilm by a pathogen, such as a yeast. Thus, in a further embodiment, the present disclosure provides the use of a bifunctional peptidoglycan/chitin hydrolase or a composition comprising said peptidoglycan hydrolase to reduce and/or prevent the formation of a biofilm by a pathogen, such as a yeast.

Another aspect of the present invention is directed to a bifunctional peptidoglycan/chitin hydrolase for use human and veterinary medicine; in particular for use in the treatment and/or prevention of pathogenic infections. Further, said bifunctional peptidoglycan/chitin hydrolase can also be present in a composition wherein said bifunctional peptidoglycan/chitin hydrolase in said composition is for use in human and veterinary medicine; in particular for use in the treatment and/or prevention of pathogenic infections is disclosed.

In another embodiment, said bifunctional peptidoglycan/chitin hydrolase or the composition wherein said bifunctional peptidoglycan/chitin hydrolase is present for use in the treatment and/or prevention of pathogenic infections has a pH lower than 7.

In yet another embodiment, said composition wherein said bifunctional peptidoglycan/chitin hydrolase is present for use in the treatment and/or prevention of pathogenic infections further comprises an acid; in particular a lactic acid.

Typical for the present invention, the bifunctional peptidoglycan/chitin hydrolase according to the different embodiments of the invention is characterized in that it has chitinase activity. In other words, the bifunctional peptidoglycan/chitin hydrolase in all the different embodiments of the present invention can also be described as a peptidoglycan hydrolase with chitinase activity. In said context, chitinase activity is similar to chitin hydrolase activity.

In yet another embodiment, the bifunctional peptidoglycan/chitin hydrolase according to the different embodiments of the present invention is major secreted protein 1 (Msp1). In still a further embodiment, the bifunctional peptidoglycan/chitin hydrolase according to the different embodiments of the invention is Msp1 and has chitinase (or chitin hydrolase) activity.

In a further aspect, the bifunctional peptidoglycan/chitin hydrolase according to the different embodiments of the invention comprises at least 70%, in particular at least 85%, even more in particular at least 90%, 95% or 99%, sequence homology to SEQ ID NO: 1 (WP_005687638.1). In another embodiment, the bifunctional peptidoglycan/chitin hydrolase according to the different embodiments of the present invention is encoded by a nucleic acid comprising a nucleotide sequence with at least 70%, in particular at least 85%, even more in particular at least 90%, 95% or 99%, homology to SEQ ID No: 2 (8422039).

In another aspect, the bifunctional peptidoglycan/chitin hydrolase according to the different embodiments of the invention comprises at least 70%, in particular at least 85%, even more in particular at least 90%, 95% or 99%, sequence homology to SEQ ID NO: 3. In another embodiment, the bifunctional peptidoglycan/chitin hydrolase according to the different embodiments of the present invention is encoded by a nucleic acid comprising a nucleotide sequence with at least 70%, in particular at least 85%, even more in particular at least 90%, 95% or 99%, homology to SEQ ID No: 4.

In still another aspect, the bifunctional peptidoglycan/chitin hydrolase according to the different embodiments of the present invention is obtained from a *Lactobacillus* strain. In a further aspect, the bifunctional peptidoglycan/chitin hydrolase according to the different embodiments of the present invention is obtained from a *Lactobacillus* strain selected from the group comprising *Lactobacillus rhamnosus, Lactobacillus casei, Lactobacillus paracasei*, or *Lactobacillus fermentum*.

As already mentioned above, the present invention provides the use of a bifunctional peptidoglycan/chitin hydrolase to reduce and/or prevent hyphae formation in a pathogen. In a further embodiment, said pathogen is selected from a yeast or a bacterium; preferably from a yeast. In still a more preferred embodiment, the pathogen is selected from *Candida, Aspergillus* or *Fusarium*. In an even more preferred embodiment, the pathogen is selected from *Candida albicans, Candida tropicalis* or *Candida dubliniensis*.

As also mentioned above, one aspect of the invention is directed to a bifunctional peptidoglycan/chitin hydrolase according to all the different embodiments as disclosed herein for use in human and veterinary medicine, in particular for use in the treatment and/or prevention of pathogenic infections. In a further embodiment, said pathogenic infections are selected from yeast infections or bacterial infections, preferably from yeast infections. In still a further embodiment, the pathogenic infections are selected from *Candida* infections, *Aspergillus* infections, or *Fusarium* infections. Even more in particular the pathogenic infections are selected from infections caused by *Candida albicans, Candida tropicalis*, or *Candida* dubliniensis. In another aspect, the pathogenic infections are selected from vaginal infections, urogenital infections, oral infections, gastro-intestinal infections, upper respiratory tract infections, pulmonary infections, and skin infections. In still a further embodiment, the invention is directed to a bifunctional peptidoglycan/chitin hydrolase according to all the different embodiments as disclosed herein for use in the treatment and/or prevention of vaginal infections, urogenital infections, oral infections, gastro-intestinal infections, upper respiratory tract infections, pulmonary infections, or skin infections caused by a pathogen; in particular caused by a yeast or a bacterium; even more in particular caused by *Candida, Aspergillus* or *Fusarium*; even more particular caused by *Candida albicans, Candida tropicalis*, or *Candida* dubliniensis.

BRIEF DESCRIPTION OF THE DRAWINGS

With specific reference now to the figures, it is stressed that the particulars shown are by way of example and for purposes of illustrative discussion of the different embodiments of the present invention only. They are presented in the cause of providing what is believed to be the most useful and readily description of the principles and conceptual aspects of the invention. In this regard no attempt is made to show structural details of the invention in more detail than is necessary for a fundamental understanding of the invention. The description taken with the drawings making apparent to those skilled in the art how the several forms of the invention may be embodied in practice.

DETAILED DESCRIPTION OF THE INVENTION

Figure 1:
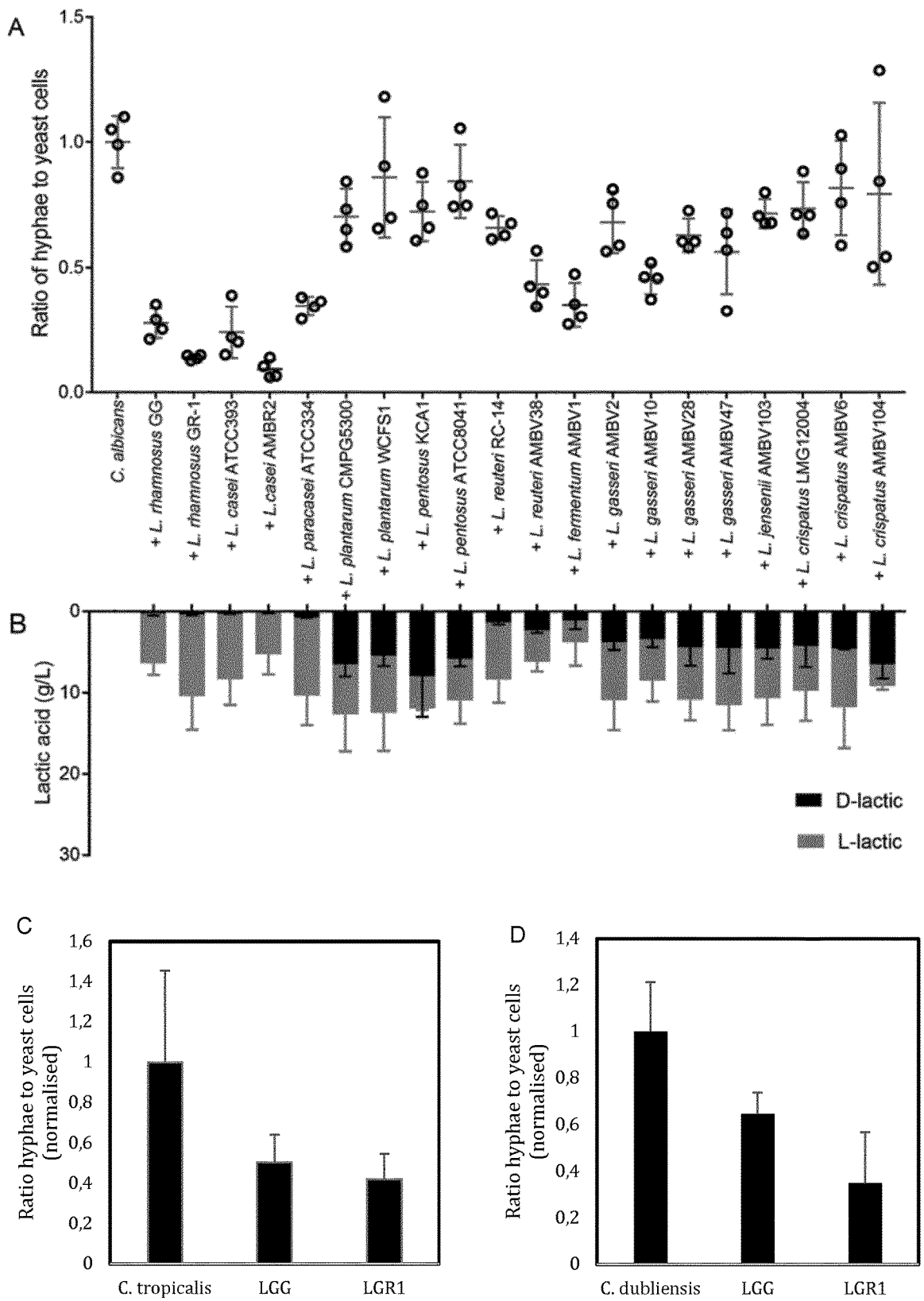
FIG. 1: Antihyphal activity and lactic acid production of specific *Lactobacillus* strains. (A) Hyphal induction of *C. albicans* ($10^6$ cells/ml) during co-incubation with live *Lactobacillus* cells ($10^8$ CFU/ml) and (B) D- and L-lactic acid production of the investigated *Lactobacillus* strains after growth into stationary phase. In (C-D) hyphal induction of *C. tropicalis* and *C. dubliensis* during co-incubation with live *L. rhamnosus* GG and *L. rhamnosus* GR-1 is shown.

The present application is based on the finding that a bifunctional peptidoglycan/chitin hydrolase, for example produced by a *Lactobacillus* strain of the *Lactobacillus casei* group or *L. fermentum* group, has the capacity to reduce and/or prevent hyphae formation in a pathogen, such as a yeast or a bacterium.

Hyphae formation in pathogens is defined as the reversible transition between unicellular cells and the filamentous hyphal growth form. Compared to cell walls of unhyphenised cells, the hyphal cell wall is more rigid due to higher levels of chitin and is decorated with other (glyco)proteins.

The inventors of the present application have now found that a particular bifunctional peptidoglycan/chitin hydrolase is able to inhibit or reduce hyphal morphogenesis. As detailed herein above, the present invention therefore provides the use of such a bifunctional peptidoglycan/chitin hydrolase to reduce and/or prevent hyphae formation in a pathogen. In a further embodiment, said bifunctional peptidoglycan/chitin hydrolase can be present in a composition. In yet another further embodiment, said composition comprises the bifunctional peptidoglycan/chitin hydrolase and a *Lactobacillus* strain; in particular a *Lactobacillus* strain selected from the group comprising *Lactobacillus rhamnosus*, *Lactobacillus casei*, *Lactobacillus paracasei* or *Lactobacillus fermentum*.

In a further embodiment of the invention, the bifunctional peptidoglycan/chitin hydrolase that reduces and/or prevents hyphae formation in a pathogen is obtained from a *Lactobacillus* strain. *Lactobacillus* strains with peptidoglycan hydrolase activity are for example from the group *Lactobacillus fermentum*, *Lactobacillus rhamnosus*, *Lactobacillus casei*, *Lactobacillus paracasei*.

The fungal cell wall is composed of chitin (acetylglucosamine polymers), glucans, polysaccharides and mucopolysaccharides, waxes and pigments. Chitin is a structurally important component of the fungal cell wall located closest to the plasma membrane, and contributes to the mechanical strength of the cell wall, including formation of hyphae. Without chitin synthesis, growing hyphae tend to lyse.

Peptidoglycan hydrolases are the enzymes responsible for cleaving the bonds in peptidoglycan chain and side-chain branches, and, therefore, are responsible for overall cell wall peptidoglycan turnover. Three main classes of bacterial peptidoglycan hydrolases are glycosidases that cleave the backbone of glycan, the amidases that cleave the side chain peptide and peptidases that cleave within the peptide side chain, which are further divided based on their site of cleavage.

The inventors have here found that a peptidoglycan hydrolase, in particular the peptidoglycan hydrolase major secreted protein 1 (Msp1), shows an additional and unexpected hydrolytic activity against the hyphal cell wall of pathogens such as fungi. In particular, said peptidoglycan hydrolase (e.g. Msp1) acts as a bifunctional peptidoglycan hydrolase, thereby cleaving the acetylglucosamine linkages in the chitin of the cell wall of the yeast, in addition to its previously published endopeptidase activity on peptidoglycan (Claes et al., 2012). As a result, the peptidoglycan hydrolase is able to reduce and/or prevent the formation of the hyphae in a pathogen such as a yeast. In the present application, said peptidoglycan hydrolase is therefore referred to as a bifunctional peptidoglycan/chitin hydrolase, or as a peptidoglycan hydrolase with chitinase activity.

The inventors further identified that the bifunctional peptidoglycan/chitin hydrolase of the present invention thus shows chitinase activity. Therefore, in a further aspect of the invention, the bifunctional peptidoglycan/chitin hydrolase according to the different embodiments of the invention has chitinase activity. This chitinase activity contributes to the capacity of the peptidoglycan hydrolase to reduce and/or prevent hyphae formation in a pathogen. In another embodiment, the bifunctional peptidoglycan/chitin hydrolase according to the different embodiments of the invention shows glucosamidase activity.

Chitinases (EC 3.2.1.14) are glycosyl hydrolases with sizes ranging from 20 kDA to about 90 kDA. They are present in a wide range of organisms such as bacteria, fungi, yeasts, plants, actinomycetes, arthropods, and humans. Chitinases have the ability to degrade chitin directly to low molecular weight chitooligomers, which serve a broad range of industrial, agricultural, and medical functions such as elicitor action and anti-tumor activity.

Chitinase can be more specifically been divided into 2 main groups: endochitinases (EC 3.2.1.202) and exochitinases (EC 3.2.1.200 and EC 3.2.1.201). The endochitinases randomly split chitin at internal sites, thereby forming the dimer dicetylchitobiose and soluble low molecular mass multimers of N-acetylglucosamine such as chitotriose, and chitotetraose. The exochitinases have been further divided into 2 subcategories: chitobiosidases (EC 3.2.1.29), which are involved in catalyzing the progressive release of di-acetylchitobiose starting at the non-reducing end of the chitin microfibril, and 1-4-β glucosaminidases (EC 3.2.1.30), cleaving the oligomeric products of endochitinases and chitobiosidases, thereby generating monomers of N-acetylglucosamine.

Chitin is the second most plenteous polysaccharide in nature after cellulose, and is for example present in cell walls of several fungi. Chitin is a linear stable polymer of beta-1,4-N-acetylglucosamine, which is 2-acetamido-2-de-oxy-D-glucose.

In the present invention, the inventors have found that the effect of the peptidoglycan hydrolase on the hyphae formation in pathogens, such as fungi, can be explained by a combination of its hydrolase activity with its chitinase activity.

The bifunctional peptidoglycan/chitin hydrolase as used in the different embodiments of the present invention can be obtained from a *Lactobacillus* strain. The *Lactobacillus* strain can be selected from the group comprising *Lactobacillus rhamnosus, Lactobacillus casei, Lactobacillus paracasei*, and *Lactobacillus fermentum*. In a preferred embodiment, the bifunctional peptidoglycan/chitin hydrolase according to the different embodiments of the invention is produced by *Lactobacillus rhamnosus* GG.

As already mentioned above, the formation of hyphae is typical for certain pathogens, including yeasts or bacteria (Könönen and Wade, 2015). Therefore, the present invention provides the use of a bifunctional peptidoglycan/chitin hydrolase, or a composition comprising said peptidoglycan hydrolase to reduce and/or prevent hyphae formation in a pathogen, in particular wherein the pathogen is a yeast or bacterium, preferably a yeast. Said yeasts can be selected from *Candida, Aspergillus* or *Fusarium*. In an even further embodiment, said yeast is selected from *Candida albicans, Candida tropicalis* or *Candida* dubliensis.

In a further aspect of the invention, the inventors have found that the effect of the bifunctional peptidoglycan/chitin hydrolase on the formation of hyphae was increased in an acidic environment. This acidic environment can be created by the production of lactic acid by the pathogen, for example the *Lactobacillus* strain, or by creating an acidic environment by the addition of an acid, such as lactic acid or L-lactic acid. The presence of lactic acid, either produced by the *Lactobacillus* strain that also produces the peptidoglycan hydrolase, or lactic acid added additionally, results in a synergistic effect of the bifunctional peptidoglycan/chitin hydrolase on the reduction and/or prevention of hyphae formation in the pathogens.

Further, the present application is directed to the use of a composition comprising a bifunctional peptidoglycan/chitin hydrolase to reduce and/or prevent hyphae formation in a pathogen. In a further embodiment, said composition has a pH lower than 7. In yet another embodiment, said composition further comprises an acid; preferably a lactic acid such as L-lactic acid.

The present application is also directed to use of bifunctional peptidoglycan/chitin hydrolase to reduce and/or prevent hyphae formation in a pathogen, wherein said bifunctional peptidoglycan/chitin hydrolase is present in a composition. In a further aspect, said composition has a pH lower than 7. In yet another aspect, said composition further comprises an acid; preferably a lactic acid such as L-lactic acid.

In another embodiment, the compositions according to this invention may also comprise other probiotic agents.

In another embodiment, the present invention provides the use of a bifunctional peptidoglycan/chitin hydrolase in all the disclosed embodiments to reduce and/or prevent hyphae formation in a pathogen, thereby reducing and/or preventing the formation of a biofilm by a pathogen. Thus, in a further embodiment, the present invention provides the use of a bifunctional peptidoglycan/chitin hydrolase to reduce and/or prevent the formation of a biofilm by a pathogen. In all said embodiments, the bifunctional peptidoglycan/chitin hydrolase is obtained from a *Lactobacillus* strain; in particular from a *Lactobacillus* strain selected from the group comprising *Lactobacillus rhamnosus, Lactobacillus casei, Lactobacillus paracasei*, or *Lactobacillus fermentum*.

In another aspect, the present invention provides the use of a bifunctional peptidoglycan/chitin hydrolase according all its embodiments to prevent and/or inhibit biofilm formation by a pathogen.

Biofilms are a protected niche for micro-organisms, where they are safe from antibiotic or antifungal treatment and can create a source of persistent infection. Biofilms are the most common mode of bacterial and fungal growth in nature and are also important in clinical infections. In the present invention, the inventors show that the bifunctional peptidoglycan/chitin hydrolase is able to inhibit biofilm formation, in particular biofilm formation of *Candida albicans*.

In another aspect of the present invention, the use of the bifunctional peptidoglycan/chitin hydrolase according to all its possible embodiments is provided as an anti-pathogenic agent in non-medical applications. In a further aspect, said non-medical application are selected from personal hygiene industry, food industry, biocontrol industry, crop protection, cleaning industry, pharma industry.

Thus, in one embodiment, the use of a bifunctional peptidoglycan/chitin hydrolase in all its embodiments to reduce and/or prevent hyphae formation in a pathogen in personal hygiene industry is disclosed. The personal hygiene industry comprises the production of tissues, protective masks or sprays. Even more in particular, said tissues, protective masks or sprays are directed towards the treatment and/or prevention of pathogenic infections. For example, the bifunctional peptidoglycan/chitin hydrolase of the present invention can be incorporated in said tissues, protective masks or sprays during their production process in all the applications of the personal hygiene industry.

In another embodiment of the invention, the use of a bifunctional peptidoglycan/chitin hydrolase according to all its possible embodiments is provided to reduce and/or prevent hyphae formation in a pathogen in the food industry. Said food industry can encompass fermented food products (dairy-based, worth, soy, vegetables) or the bioreactors and processing environments used in food industry. For example, the bifunctional peptidoglycan/chitin hydrolase of the present invention can be incorporated in said fermented food products, or in the bioreactors and processing environments used in food industry. Also, the use in cleaning industry or in the pharma industry is described. Herein, the bifunctional peptidoglycan/chitin hydrolase of the present invention, can be used to reduce and/or prevent hyphae formation in a pathogen, and thereby ensuring a clean and sterile environment. For example, the bifunctional peptidoglycan/chitin hydrolase of the present invention can be added to a cleaning product.

In another embodiment, the bifunctional peptidoglycan/chitin hydrolase of the present invention is provided for use in biocontrol industry. In particular, biocontrol industry is defined as the production and/or application of biocontrol agents for crop protection. Therefore, in an even further embodiment, the present invention provides the use of the bifunctional peptidoglycan/chitin hydrolase, according to the different embodiments of the invention, as a biocontrol agent. In another embodiment, the use of the bifunctional peptidoglycan/chitin hydrolase according to the different embodiments of the invention as crop protection agent is provided.

In a final aspect of the present invention, the bifunctional peptidoglycan/chitin hydrolase in all its different embodiments is provided for use in the treatment and/or prevention of pathogenic infections; in particular infections caused by yeasts or bacteria.

In still a further embodiment, the pathogenic infections are selected from *Candida* infections, *Aspergillus* infections, or *Fusarium* infections. Even more in particular the pathogenic infections are selected from infections caused by *Candida albicans*, *Candida tropicalis*, or *Candida dubliniensis*. In another aspect, the pathogenic infections are selected from vaginal infections, urogenital infections, oral infections, gastro-intestinal infections, upper respiratory tract infections, pulmonary infections, and skin infections.

Urogenital infections may include bladder infections. Oral infections and upper respiratory tract infections may include infections of the oronasopharyngeal cavity, otitis media, pharyngitis, chronic sinusitis, acute sinusitis, rhinitis, mucositis, caries, gingivitis, or halitosis and the like. Gastro-intestinal infections may include colitis, stomach infections, inflammatory bowel disease, irritable bowel syndrome, and the like. Pulmonary infections may include bronchitis and pneumonia. Skin infections include acne vulgaris, psoriasis, burn wounds, cellulitis, impetigo, athlete's feet (tinea pedis), fungal nail infections, or warts, and the like.

In still a further embodiment, the invention is directed to a bifunctional peptidoglycan/chitin hydrolase according to this invention, for use in the treatment and/or prevention of vaginal infections, urogenital infections, oral infections, gastro-intestinal infections, upper respiratory tract infections, pulmonary infections, or skin infections caused by a pathogen; in particular caused by a yeast or a bacterium; even more in particular caused by *Candida*, *Aspergillus* or *Fusarium*; even more particular caused by *Candida albicans*, *Candida tropicalis*, or *Candida dubliniensis*.

EXAMPLES

Materials and Methods

Microbial Strains and Culture Conditions.

*Lactobacillus* strains (Table 1) were grown at 37° C. without agitation in de Man, Rogosa and Sharpe (MRS) broth (Difco, Erembodegem, Belgium). *C. albicans* SC5314, *C. tropicalis* DSM4238 and *C. dubliensis* DSM13268 were grown in yeast extract peptone dextrose (YPD) broth (Carl Roth, Karlsruhe, Germany) at 37° C. and constant shaking.

TABLE 1

Bacterial strains used in this study

| Strain | Description | Characteristics |
|---|---|---|
| L. rhamnosus GG ATCC53103 | Wild-type | Intestinal isolate |
| L. rhamnosus CMPG5351 | welE mutant of L. rhamnosus GG | Lacks long, galactose-rich exopolysaccharides and shows increased exposure of SpaCBA pili |
| L. rhamnosus CMPG5540 | dltD mutant of L. rhamnosus GG | Lacks D-alanylation of lipoteichoic acid and increased exposure of certain surface proteins |
| L. rhamnosus CMPG5357 | spaCBA mutant of L. rhamnosus GG | Lacks expression of spaCBA pili |
| L. rhamnosus CMPG10701 | llp1 mutant of L. rhamnosus GG | Lacks expression of Llp1 lectin |
| L. rhamnosus CMPG10706 | llp2 mutant of L. rhamnosus GG | Lacks expression of Llp2 lectin |
| L. rhamnosus CMPG10200 | msp1 mutant | Lacks expression of peptidoglycan endopeptidase domein of Msp1 (Claes et al., 2012) |
| L. rhamnosus GR-1 ATCC 5582 | Wild-type | |
| L. casei AMBR2 | Wild-type | |
| L. casei ATCC 393 | Wild-type | |
| L. paracasei ATCC 334 | Wild-type | |
| L. pentosus KCA1 | Wild-type | |
| L. pentosus ATCC8041 | Wild-type | |
| L. plantarum WCFS1 | Wild-type | |
| L. plantarum CMPG5300 | Wild-type | |
| L. reuteri RC-14 ATCC 55845 | Wild-type | |

TABLE 1-continued

Bacterial strains used in this study

| Strain | Description | Characteristics |
| --- | --- | --- |
| L. reuteri AMBV38 | Wild-type | Vaginal isolate |
| L. fermentum AMBV1 | Wild-type | Vaginal isolate |
| L. gasseri AMBV2 | Wild-type | Vaginal isolate |
| L. gasseri AMBV10 | Wild-type | Vaginal isolate |
| L. gasseri AMBV28 | Wild-type | Vaginal isolate |
| L. gasseri AMBV47 | Wild-type | Vaginal isolate |
| L. jensenii AMBV103 | Wild-type | Vaginal isolate |
| L. crispatus LMG12004 | Wild-type | |
| L. crispatus AMBV6 | Wild-type | Vaginal isolate |
| L. crispatus AMBV104 | Wild-type | Vaginal isolate |

The Lactobacillus strains collected in this application, were isolated onto MRS agar plates, after 24 h incubation at 37° C. The isolates were taxonomically characterized to the species level by sequencing the 16S ribosomal RNA gene. Briefly, the complete 16S rRNA gene (1.5 kb) was amplified with the universal 27F and 1492R primers and sequenced. The obtained sequences were compared with reference 16S rRNA gene sequences by BLAST analysis at the National Center for Biotechnology Information (NCBI) website (blast.ncbi.nlm.nih.gov/Blast.cgi).

The study was reviewed and approved by the ethical committee of regional hospital of Tienen (Belgium) and all patients gave their explicit consent before sampling.

Inhibition of Hyphal Formation in C. albicans.

Candida (albicans, dubliensis, and tropicalis) hyphae were induced by incubating $10^6$ CFU/ml cells with 10% FCS, for 3 h at 37° C. in the wells of a 24-well plate, in a total volume of 500 µl per repetition and 4 biological repetitions per condition. To investigate the effect of lactobacilli $10^8$ CFU/ml L. rhamnosus strains were added to the wells and co-incubated. To investigate the effect of Msp1, 5 µg/ml or 10 µg/ml of purified Msp1 from L. rhamnosus GG or L. rhamnosus GR-1 was added to the wells and co-incubated. To investigate the effect of acids, 100 µl of a 1% lactic acid or 1% butyric acid was added to the wells and co-incubated. After (co-) incubation for 3 h, at least 100 yeast cells and/or hyphae were counted in each well (4 per condition) and the ratio of hyphae to yeast cells was calculated.

The inhibiting effects on C. albicans biofilms were assessed. Briefly, C. albicans was grown overnight in YPD medium and suspended to $10^6$ CFU/ml and added to the wells of a 96 well plate (80 µl/well), together with the samples (supernatant, lactic acid, Msp1) or controls (MRS or H20). After incubation for 24 h at 37° C., the biofilms were washed twice and then 2,3-bis (2-methoxy-4- nitro-5-sulfophenyl)-2H-tetrazolium-5-carboxanilide (90 µl, 1 mg/ml) (Sigma Aldrich) and phenazine methosulphate (10 µl, 0.2 mg/ml) (Sigma Aldrich) were added to the wells. After a second incubation (37° C., 30 minutes, in the dark), the absorbance at 492 nm was measured using a Synergy™ HTX multi-mode reader (Biotek, Drogenbos, Belgium).

UV-Inactivation and Heat-Killing of Lactobacilli.

After two washing steps, lactobacilli were UV-inactivated by three repeats of 15 minutes of UV irradiation, and heat-killed by incubating 20 minutes at 80° C. Inactivation was confirmed by plating on MRS agar.

Preparation of Cell-Free Supernatant.

Overnight cultures of lactobacilli were grown without agitation in MRS medium at 37° C. Cell-free supernatant was prepared by centrifuging the culture at 2000×g for 10 min at 4° C. and then filtering through 0.2 µm filters (VWR, Haasrode, Belgium). Raw fractions were obtained by subsequent size separation with spin filters (>100 kDa, >10 kDa, >1 kDa) and additional washes with PBS.

D- and L-Lactic Acid Production.

After overnight incubation, cell-free supernatant was obtained by centrifugation (10 min, 2000×g, 4° C.) and filter sterilization through 0.2 µm filters. The concentration of D- and L-lactic acid was measured with the commercially available kit from R-Biopharm (Darmstadt, Germany).

Isolation of Llp1 and Llp2 from L. rhamnosus GG. The Llp1 and Llp2 proteins from L. rhamnosus GG were isolated as described before (Petrova et al., 2016). Briefly, the production of the recombinant protein was induced with 1 mM isopropyl 13-D-thiogalactopyranoside (IPTG) in recombinant E. coli BL21 cells expressing the lectins (CMPG10708 and CMPG10709). After incubation (25° C., shaking), the pellets were suspended in non-denaturing lysis buffer (50 mM NaH$_2$PO$_4$, 300 mM NaCl and 20 mM imidazole) and sonicated to release the soluble recombinant lectins from the cells. Afterwards, the lectins were purified using affinity chromatography with a HisTrap™ HP column (GE Healthcare) and size exclusion chromatography with a Highload™ 16/60 column packed with a matrix of Superdex™ prep grade (GE Healthcare).

Msp1 was purified by cationic exchange chromatography as described previously (Lebeer et al., 2012). Briefly, for purification of Msp1 from the CFS of L. rhamnosus GG, cultures were centrifuged at 2000×g for 10 min. at 4° C. and then filtering through 0.2 µm filters was performed. Raw fractions were obtained by subsequent size separation with spin filters (>100 kDa and >10 kDa) and additional washes with PBS. Msp1 was further purified from the CFS (fractions between 10 and 100 kDa) by cationic exchange chromatography as described previously (Lebeer et al., 2012). Briefly, the culture supernatant was loaded onto SP Sepharose High Performance (GE Healthcare), equilibrated with 60 mM lactate buffer (pH 4.0). Lactate buffer containing ascending NaCl concentrations (100-1000 mM) was used to elute bound protein. Fractions containing Msp1 were identified using SDS-PAGE and concentrated using Vivaspin™ filters (MW cut off 10,000) (Sartorius Stedim biotech GmbH, 37070 Goettingen, Germany).

Deglycosylation of Msp1.

Msp1 was chemically deglycosylated by trifluoromethanesulphonic acid (TFMS) method (-20° C., for 30 minutes) (Lebeer et al., 2012). After treatment, the proteins were extensively dialyzed and analyzed by SDS-PAGE.

Chitinase activity of Msp1.

First, the chitinase activity of Msp1 was investigated based on breakdown of chitin-azure (Sigma), as described previously. Further confirmation was based on inhibition of chitinase activity by 2.5 mM Bisdionine C (Sigma), as described previously.

Anti-Msp1 rabbit antiserums were used on wild-type and dltD mutant cells. Anti-rabbit IgG antibodies conjugated with Alexa Fluor 488 were used to visualize Msp1 localization on the cells. Samples were visualized with a Zeiss Axio™ Imager Z1, equipped with an AxioCam™ MRm Rev.3 monochrome digital camera. The samples were imaged with a 'Plan-Neofluar™ 100x/1.3 Oil Ph3 objective. Images were analysed with the supplied AxioVision™ Re1.4.6 software making overlays of phase-contrast and fluorescent images.

The protein concentration in the cell-free supernatant of *L. rhamnosus* GG and CMPG5540 was determined using bicinchoninic acid (BCA) protein assay. The wells of a 96-well ELISA plate (Greiner, Bio-one) were coated overnight with supernatant (0.5 µg/mL), after lyophilization and resolving in PBS, or Msp1 (at different concentration, standard curve) at 37° C. Afterwards, the wells were washed three times with PBS/T (PBS with 0.05% Tween 20), 250 µL PBS/T with 25% solution of skimmed milk was added and the plate was incubated for 1 hour at 37° C. to block a specific binding. Next, the wells were washed three times with PBS/T and each well was then filled with 100 µL of Msp1 antiserum diluted 1:2000 in PBS/T and incubated (37° C., 90 min). Alkaline phosphate-conjugated goat anti-rabbit immunoglobulin G (IgG, Sigma) was diluted 1:3000 in PBS/T and added to each well (100 µL) before incubation (37° C., 1 h). After incubation (30 min, 37° C.) of the bound antibodies with 150 µL of p-nitrophenyl phosphate (1 mg/mL in 1 M Tris-HCl, pH 9.8) (Sigma) per well, the absorbance (405 nm) of each well was read with a Synergy™ MX microtiter plate reader (Biotek Instruments).

Shapiro-Wilk normality test (GraphPad Prism™ 7.02, CA, USA) was used to determine whether the data are normally distributed. Statistical significance between conditions was estimated by one-way ANOVA and Tukey's multiple comparisons test.

Results

Selected *Lactobacillus* Strains Show Strong Hyphae-Inhibitory Activity.

First, we aimed to compare the anti-*Candida* activity between different *Lactobacillus* taxa. Since hyphal morphogenesis is the most important virulence factor of *C. albicans*, *C. tropicalis*, and *C. dubliensis*, we focused on the effect of lactobacilli on serum-induced hyphal morphogenesis in said *Candida*. We selected strains available in-house or in the Belgian Co-ordinated Collections of Micro-organisms, representing the different taxa/phylogenetic groups that have been recently described as being mainly nomadic or vertebrate-adapted. Strains were thus selected from the *L. casei* group, *L. plantarum* group, *L. reuteri*, *L. fermentum*, *L. gasseri*, *L. jensenii* and *L. crispatus*. The inhibition rates on the hyphae formation in *C. albicans* showed large variation among the tested strains, ranging from 91% (*L. casei* AMBR2) to 14% (*L. plantarum* WCFS1) (FIG. 1A).

Lactic acid has been described as key bio-active metabolite of *Lactobacillus*, also reported to affect *C. albicans*, therefore we next measured the concentration of D-lactic and L-lactic in the supernatant of these strains, after growth into stationary phase. All strains were able to produce lactic acid from glucose, although in different ratios of D- and L-lactic acid (FIG. 1B). The total amount of lactic acid did, however, not show a relationship with the levels of hyphal inhibitory activity of the tested lactobacilli, nor did the amount of either isomer.

The five best performing strains in our tests all belonged to the *L. casei* group (*L. rhamnosus, L. casei* and *L. paracasei*).

Finally, we here also show that hyphal morphogenesis is also inhibited in *Candida tropicalis* and *Candida dubliensis*. In particular, both *L. rhamnosus* GG and *L. rhamnosus* GR-1 inhibit FCS-induced hyphal formation in *C. tropicalis* in *C. dubliensis* (FIG. 1C-D)

The Major Peptidoglycan Hydrolase of *L. rhamnosus* GG and Lactic Acid Jointly Mediate *C. albicans* Hyphae Inhibition.

Figure 2:
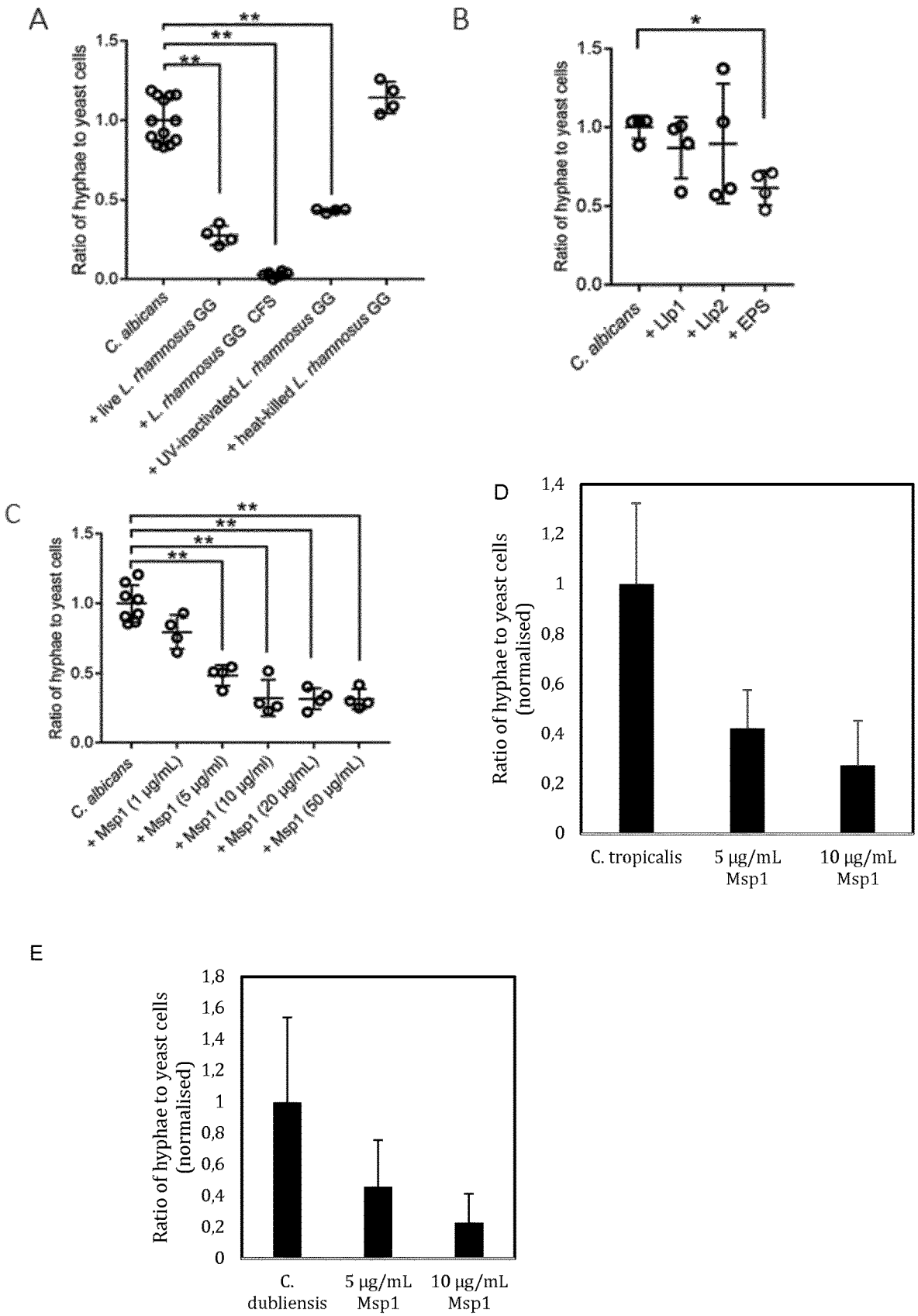
FIG. 2. Inhibition of *C. albicans*, *C. tropicalis* and *C. dubliensis* hyphae by *L. rhamnosus* GG and its components. Hyphal induction of *C. albicans* ($10^6$ cells/ml) during co-incubation with (A) live *L. rhamnosus* GG cells, cell-free supernatant (CFS), UV-inactivated cells and heat-killed cells ($10^8$ cells/ml); (B) the isolated lectin-like proteins Llp1 and Llp2 (50 µg/mL) and purified EPS (200 µg/mL) from *L. rhamnosus* GG; (C) different concentrations of native Msp1 from *L. rhamnosus* GG isolated from wild-type cells; (D) hyphal induction of *C. tropicalis* ($10^6$ cells/ml) during co-incubation with different concentrations of Msp1; (E) hyphal induction of *C. dubliensis* ($10^6$ cells/ml) during co-incubation with different concentrations of Msp1.

To further elucidate how *Lactobacillus* can impact hyphal morphogenesis, we first explored whether the contributing L. (para)*casei/rhamnosus* factors are surface-bound, secreted, or both. *L. rhamnosus* GG was chosen as model, since this strain is well-characterized at genetic and molecular level. We first compared the effect of live *L. rhamnosus* GG cells on serum-induced hyphal formation to its cell-free culture supernatant, containing solely secreted molecules, and to UV-inactivated and heat-killed *L. rhamnosus* GG cells. Cells treated in both ways should no longer secrete molecules, but in contrast to the heat-killed cells, the surface proteins of the UV-inactivated cells should not be denatured. This comparison showed that the supernatant from *L. rhamnosus* GG inhibited hyphal formation almost completely (−97%), whereas the UV-activated *L. rhamnosus* GG cells inhibited hyphal formation of *C. albicans* to the same extent as live cells (−57% and −51%, respectively) (FIG. 2A). The heat-killed cells, on the other hand, were no longer able to inhibit *C. albicans* hyphal formation. These results thus indicated that the main core *L. rhamnosus*-specific effector molecules are heat-sensitive and secreted, but can also be surface-bound or are supplemented by a cell-bound effector.

Next we explored the activity of the major documented *L. rhamnosus* GG surface molecules which were rationalized to have putative hyphae-binding properties due to lectin-sugar interactions, including the lectin-like protein 1 (Llp1) and 2 (Llp2), the galactose-rich exopolysaccharides (EPS) and its major secreted protein 1 (Msp1), which is mannosylated.

Llp1 and Llp2 have been shown to bind to D-mannose (Petrova et al., 2016) and the complex sugar mannan by sepharose-binding and glycan array screening, both of which are present in the outer layer of *C. albicans* cell wall. We therefore aimed to explore whether this sugar-binding capacity could also result in interference with hyphal morphogenesis. Treatment with Llp1 and Llp2 did, however, not show a reduction of *Candida* hyphal formation at the previously documented active concentration of 50 µg/ml (FIG. 2B). The other way around, proteins with lectin-like properties can also be found on the hyphal surface, rendering the glycoconjugates on the lactobacillary surface potential interaction partners as well. In agreement with previous results, isolated EPS from *L. rhamnosus* GG was able to inhibit hyphal morphogenesis, but only at a rather high concentration of 200 µg/mL (FIG. 2B). In contrast, and found by serendipity, the peptidoglycan hydrolase Msp1 from *L. rhamnosus* GG tested here demonstrated a remarkably strong inhibitory activity (FIG. 2C), reducing hyphal morphogenesis with more than 50%, at concentrations as low as 5 µg/mL. Further, Msp1 has a concentration-dependent effect on FCS-induced hyphal formation in *C. tropicalis* and *C. dubliensis* (FIG. 2D-E).

Figure 3:
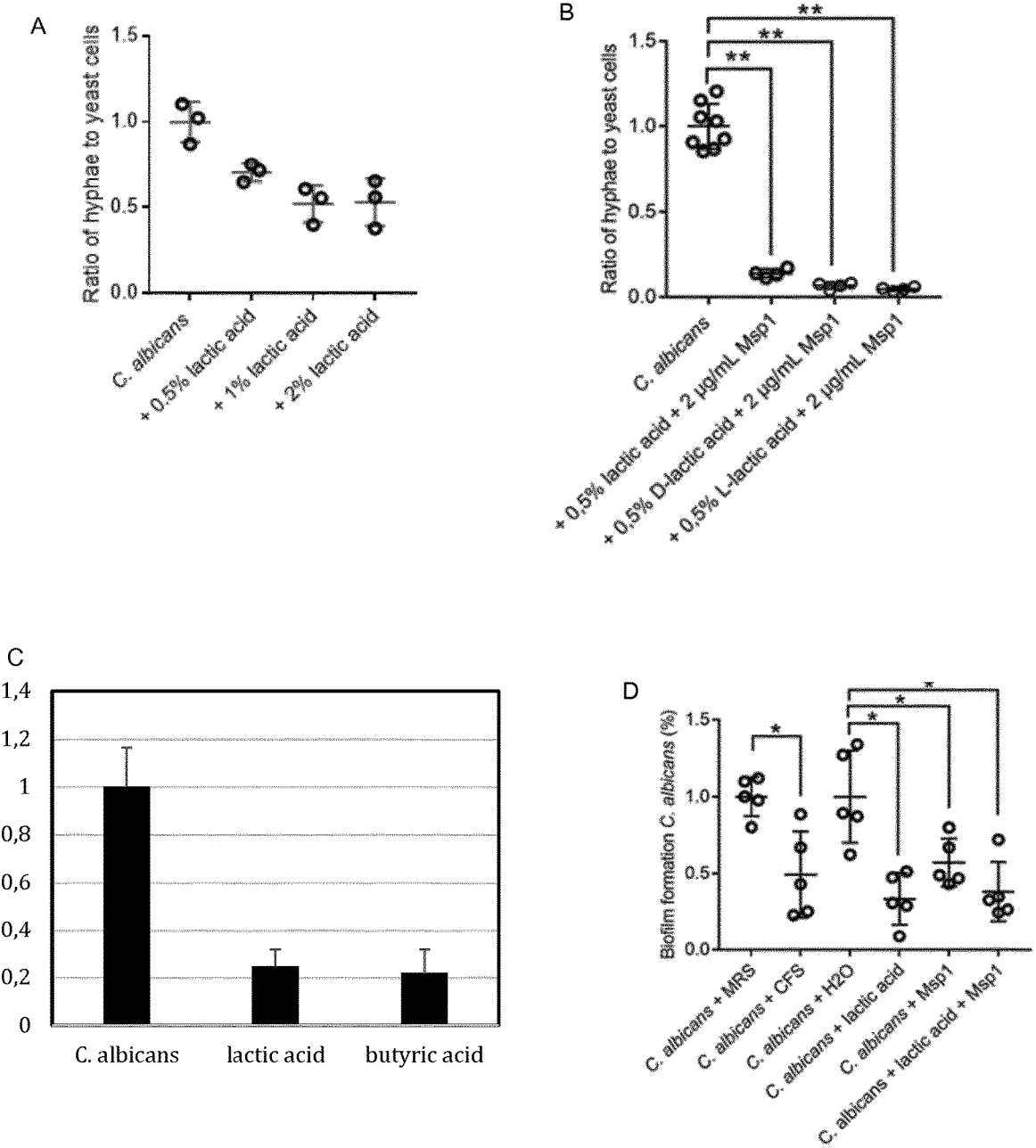
FIG. 3. Inhibition of *C. albicans* hyphae formation by *L. rhamnosus* GG and its components in the presence of an acid. Hyphal induction of *C. albicans* ($10^6$ cells/ml) during co-incubation with (A) different concentration of lactic acid (50% L-lactic acid and 50% D-lactic acid) and (B) the combination of lactic acid and Msp1; (C) effect of lactic acid and butyric acid on hyphae formation; (D) Biofilm formation during co-incubation with *L. rhamnosus* GG cell-free supernatant (CFS) (20%), lactic acid (0.4%) and Msp1 (10 µg/mL), with MRS broth and water as respective controls; Single and double asterisks indicate respectively p-values below 0.1 and 0.01, compared to *C. albicans* solely.

Even though the production of lactic acid by the lactobacilli could not explain all the observed variation in anti-hyphal activity between different *Lactobacillus* strains (FIG. 1), we also exogenously added lactic acid as such in this screening to quantify its contribution to the antihyphal activity of *L. rhamnosus* GG. Lactic acid as such (0.5-2%, a combination of D- and L-lactic acid in a 1:1 ratio) also reduced hyphal morphogenesis, approximately 50% at a concentration comparable to supernatant (1% lactic acid) (FIG. 3A). We next investigated whether Msp1 acts synergistically with lactic acid. The combination of even lower concentrations of lactic acid (0.5%) than present in the supernatant and of Msp1 (2 µg/ml) was shown to decrease hyphal formation more than 94%, a level of inhibition comparable to the cell-free supernatant, indicating this combination contains the main effectors conferring the anti-hyphal activity to *L. rhamnosus* GG (FIG. 3B). Butyric acid had comparable effects on the hyphal formation in *C. albicans*. Similarly, hydrochloric acid also inhibited hyphae formation significantly and the difference with lactic acid was not significant (FIG. 3C)

Biofilm Regulation of *C. albicans*

Hyphal morphogenesis is tightly linked to biofilm regulation of *C. albicans*, we therefore next investigated whether *L. rhamnosus* GG could also inhibit *C. albicans* biofilm formation. This experimental set-up revealed that the supernatant of *L. rhamnosus* GG was able to decrease biofilm formation of *C. albicans*. The two main components of the supernatant, lactic acid and Msp1, separately also showed anti-biofilm activity (FIG. 3D).

Mutant Analysis of *L. rhamnosus* GG Confirmed Key Role for Msp1.

Mutual interactions between the individual molecules on the lactobacillary surface might be strengthening or attenuating the anti-hyphal activity of individual purified molecules, therefore we performed additional experiments with specific *L. rhamnosus* GG isogenic mutants available from our previous research. This complementary approach also allowed us to study molecules that could not be purified to a sufficient level.

Figure 4:
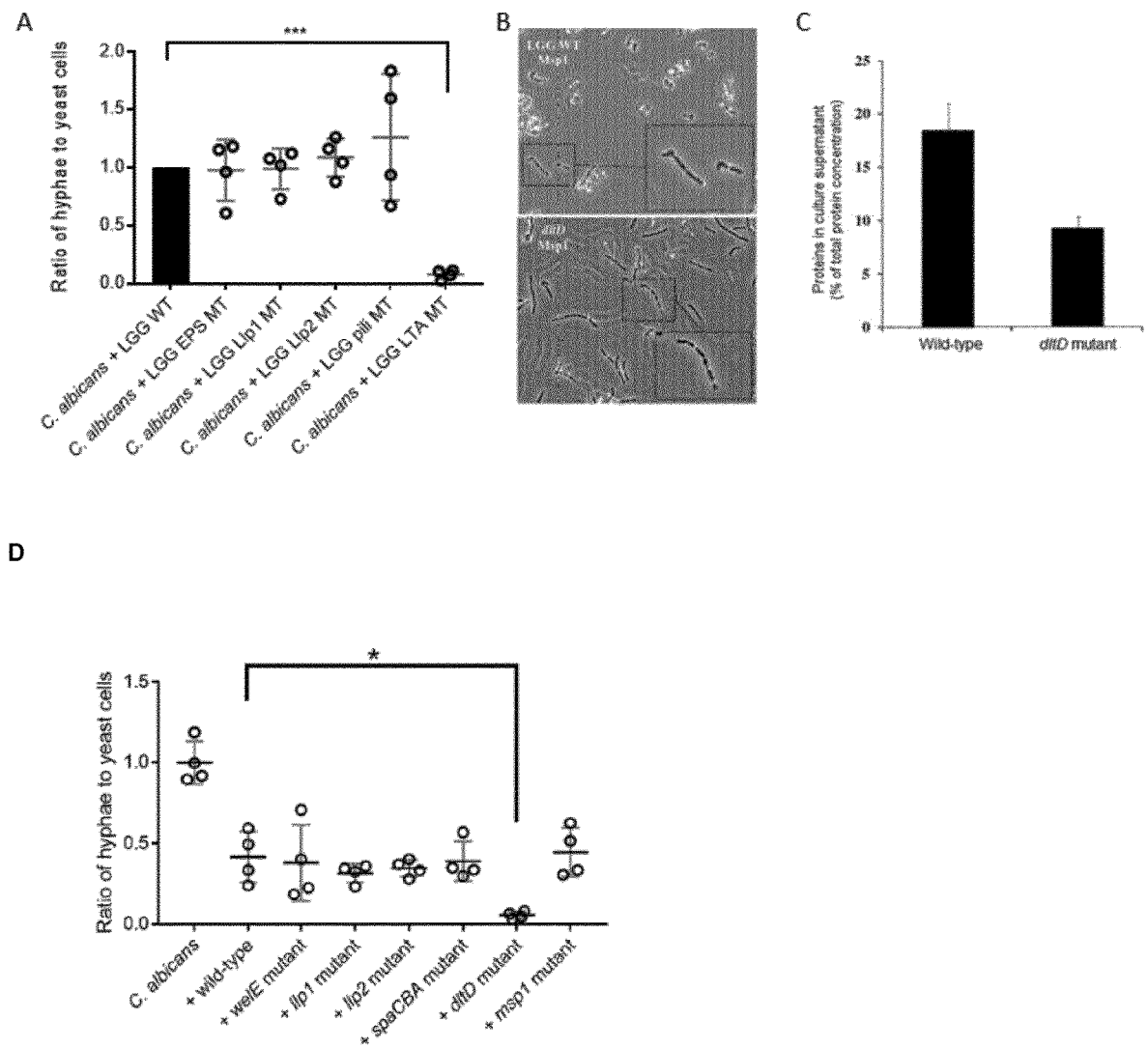
FIG. 4. Mutant analysis confirms key role for Msp1 in anti-hyphal activity. (A) Hyphal induction of *C. albicans* ($10^6$ cells/ml) during co-incubation with *L. rhamnosus* GG mutant strains, lacking long galactose-rich EPS, SpaCBA pili, D-alanylation of the lipoteichoic acids (LTA), Llp1 and Llp2 on their surface. Triple asterisks indicate p-values below 0.001, compared to *L. rhamnosus* GG wild-type. (B) Visualisation of Msp1 on the surface of wild-type (upper panel) and dltD mutant cells (lower panel) by indirect immunofluorescence using light microscopy. (C) Quantification of proteins in culture supernatant of *L. rhamnosus* GG WT and the dltD mutant using ELISA. (D) Hyphal inducation of *C. albicans* ($10^6$ cells/ml) during co-incubation with *L. rhamnosus* GG mutant strains, lacking long galactose-rich EPS, SpaCBA pili, D-alanylation of the lipoteichoic acids (LTA), Llp1 and Llp2 on their surface or with the insertional Msp1 mutant, lacking the peptidoglycan hydrolase domain ($10^8$ cells/ml). The asterisk indicates a p-value below 0.001, compared to *L. rhamnosus* GG wild-type.

Mutant analysis confirmed that the presence or absence of the EPS layer and lectins does not play a crucial role in the anti-hyphal activity of *L. rhamnosus* GG cells, as shown in FIG. 4A. We also included the spaCBA mutant of *L. rhamnosus* GG. The complex, heteropolymeric SpaCBA pili themselves are difficult to purify, but previous research with this isogenic mutant showed the importance of the pili and their fucose and mannose residues in *L. rhamnosus* GG interactions with host cells and glycoconjugates such as intestinal mucus of which structural homologs might be present on the hyphal surface. Mutant analysis showed that the presence or absence of these SpaCBA pili does not seem to play a significant role in the anti-hyphal activity of *L. rhamnosus* GG (FIG. 4A).

Unfortunately, due to the central role of Msp1 in bacterial growth and cell separation, a knock-out mutant through double homologous recombination is not available in *L. rhamnosus* GG.

However, the dltD mutant is an interesting generic surface mutant of *L. rhamnosus* GG, because the lipoteichoic acids are no longer D-alanylated, resulting in dramatic shifts in surface charge and association with surface proteins and other molecules. Remarkably, the hyphal morphogenesis of *C. albicans* was almost completely abolished by *L. rhamnosus* GG dltD mutant cells. To explore whether this also could be explained by the activity of Msp1, we checked the Msp1 presence both in the supernatant and on the surface of this highly active dltD mutant. Using fluorescently labelled anti-Msp1 antibodies showed that Msp1 is more associated with the surface of dltD mutant cells than to the wild-type surface (FIG. 4B) and is consequently less secreted in the supernatant (FIG. 4C).

Finally, we also tested the activity of an insertional msp1 mutant, named CMPG10200 (and herein referred as msp1 mutant), which does not express the second half/C-terminal peptidoglycan NLPc/p60 domain of the Msp1 protein and thus lacks the endopeptidase peptidoglycan hydrolase domain (Claes et al., 2012). The anti-hyphal activity of *L. rhamnosus* GG was not largely affected by mutagenesis of the msp1 gene as compared to the wild type with the full msp1 gene, whereas *L. rhamnosus* GG dltD mutant cells could almost completely eliminate the *C. albicans* hyphae (FIG. 4D). Moreover, the fact that the activity is not increased in the msp1 mutant CMPG10200, which still expressed Msp2, indicates that the other peptidoglycan hydrolase of *L. rhamnosus* GG is not the active peptidoglycan hydrolase.

Furthermore, hyphal induction of *C. albicans* during co-incubation with *L. rhamnosus* GG mutant strains lacking long galactose-rich EPS, Llp1, Llp2, SpaCBA pili or D-alanylation of the lipoteichoic acids (LTA) on their surface was evaluated (FIG. 4D).

The combination of the approach using either mutants or isolated molecules thus further demonstrated the key role for the bifunctional activity of Msp1 in the anti-hyphal activity of *L. rhamnosus* GG. This finding is in agreement with the fact that the other tested strains from *L. casei* group show strong activity (FIG. 1A), since Msp1 is shown to be conserved among—at least a part of—the *L. casei* group, while the other studied molecules are rather specific for the strain *L. rhamnosus* GG.

Msp1 Shows Chitinase Activity, Independent of its Glycosylation State.

Figure 5:
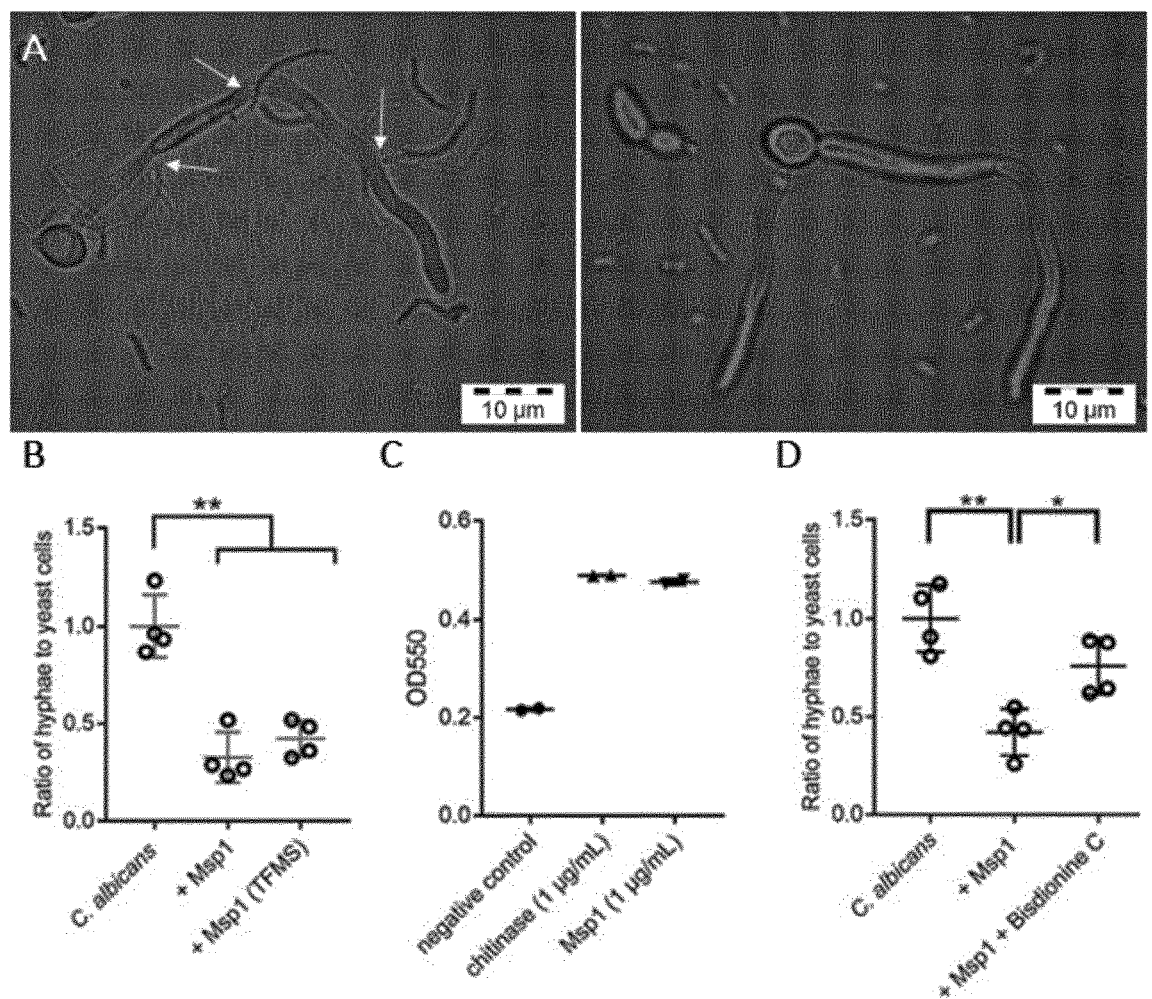
FIG. 5. Enzymatic activity of Msp1. (A) Microscopic images of *L. rhamnosus* GG (left) and *L. plantarum* WCFS1 (right) after incubation with *C. albicans* hyphae. Arrows indicate sites where the poles of lactobacilli seem to interact with the hyphae. Representative images are shown. (B) Chemical deglycosylation of Msp1 does not influence its anti-hyphal activity. (C) Msp1 can break down chitin derivative, chitin-azure. As a control, the sodium acetate buffer was used. (D) The chitinase inhibitor, Bisdionine C, can prevent hyphal inhibition partially. Asterisks indicate p-values below 0.05, double asterisks indicate p-values below 0.01, compared to *C. albicans* solely.

We subsequently aimed to explore this interaction between Msp1 hydrolase and *Candida* cells in more detail. First, we compared the binding to hyphal cells between *L. rhamnosus* GG, as strong anti-hyphal strain, and *L. plantarum* WCFS1, being one of the least effective strains tested previously (FIG. 1A). These strains belong to the limited number of *Lactobacillus* strains whose main peptidoglycan hydrolases have been thoroughly characterized. Both their major peptidoglycan hydrolases have been shown to be localized at the poles of the *Lactobacillus* cells, but they differ in hydrolytic activity and glycosylation state: Msp1 has documented γ-D-glutamyl-L-lysyl-endopeptidase activity and appears to be glycosylated with mannose residues, while Acm2 from *L. plantarum* WCFS1 was identified as an endo-β-acetylglucosaminidase and appears to be glycosylated with N-acetylglucosamine residues. We first explored whether these dissimilarities are reflected in a different interaction of the *Lactobacillus* strains with the hyphae. Microscopic inspection of *C. albicans* hyphae after induction in presence of *L. rhamnosus* GG revealed that these lactobacilli appeared mostly in contact with the hyphal cells at their polar sites (FIG. 5A). In contrast to *L. rhamnosus* GG, *L. plantarum* WCFS1 cells did not appear to closely interact with the hyphae (FIG. 5A), indicating that the specific binding of *L. rhamnosus* GG to the hyphae is important for its anti-hyphal activity.

To explore whether the binding between Msp1 and *C. albicans* hyphae could indeed be due to their sugar-lectin interactions, as suggested above, we next investigated the activity of non-glycosylated Msp1. After chemical deglycosylation, the level of hyphal inhibition showed to be similar to native (glycosylated) Msp1 (FIG. 5B), indicating that another—unexpected—mechanism probably underlies the anti-hyphal activity of Msp1.

Despite their different origin, chitin from *C. albicans* and peptidoglycan from *L. rhamnosus* GG show some structural similarities due to the presence of N-acetyl-glucosamine residues in both their backbones. Because of this, and because of the close contact between the *Lactobacillus* poles and the hyphae, we hypothesized that Msp1 might possibly be able to use chitin, being the main polymer of the hyphal cell wall, as a substrate. Based on assays with chitin-azure, we found that Msp1 is indeed able to break down chitin, to the same extent as a commercially available chitinase from *Streptomyces griseus* (FIG. 5C). Next, we determined whether a chitinase inhibitor would be able to rescue *C. albicans* hyphal morphogenesis. Bisdionine C, a known chitinase inhibitor, partially reversed the inhibitory effects of Msp1 on hyphal morphogenesis (FIG. 5D), giving additional confirmation of the chitinase activity of Msp1 is indeed underlying its anti-hyphal capacity.

Bio-Informatic Analysis Points to Conserved Nature of Msp1 of the *L. casei* Group A Blast analysis was performed at both nucleotide level and protein level. At nucleotide level, a protein with sufficient homology was found in three species, being *L. rhamnosus, L. paracasei, L. casei*. Only the strains of the *L. rhamnosus* taxa showed to have the whole gene (100% query cover) while the *L. paracasei* and the *L. casei* showed 41-44% query coverage and a min. 77-80% percentage identity. At protein level, blastP revealed most homologous proteins to be from the *Lactobacillus* genus complex.

*L. rhamnosus* contained the whole protein with percentage identity ranging from 93-100%. Some strains of *L. paracasei* and *L. casei* also contained the whole protein, but either the percentage identity was lower or the query cover. The C-terminal domain belongs to the NlpC/P60 family referring to endopeptidases, and is mostly conserved in all lactobacilli studied. This domain was shown above to be insufficient for the full chitinase activity, because the msp1 mutant lacking this domain was still able to partially inhibit the hyphae. Therefore, the N-terminal domain should also be present with minimal 74.65 percentage identity to Msp1 of *Lactobacillus rhamnosus* GG.

Bio-Informatics Analysis, in Addition to Mutant Information and TFMS Analysis, Points Towards Potential Chitinase Domain Since the biochemical characterization of Msp1 showed chitinase activity, we investigated whether we could detect chitinase-like domains in the protein encoded by the msp1 gene (LGG_00031). Unfortunately, no known chitinase-like domains could be identified with BLAST analysis. However, when we excluded *Lactobacillus* sequences from a BLASTp search on the first domain of the Msp1 protein (178 amino acid residues), one of the hits was the type 1 dockerin from Ruminococcus species (identity score of 34%). Type 1 dockerin domains are found in endoglucanases, which could possibly show similarities with chitinases, as chitin is a polymer of glucose-derivatives.

Next, we explored other potential structural parallels between the Msp1 and other chitinases. We found that the six highly conserved amino acid residues at active site of the (acidic) mammalian chitinase are also present in the first part of the Msp1 sequence (011 and et al., 2009). More specifically, six of the eight conserved residues were found at the similar (Asp-136, Arg-145) or equal (Glu-140, Asp-213, His-269, Trp-360) distances from each other in Msp1 from *L. rhamnosus* GG.

Elucidation of the crystal structure of the chitinase from *Serratia marcescens* showed that its catalytic domain to be an a/6 barrel domain (Perrakis et al., 1994). These barrel structures are composed of interconnected strand and loops (Tian and Bernstein, 2010). A similar structure was predicted for the first part of Msp1, as the online tool PredictProtein 2013 (Yachdav et al., 2014) found that this part appeared to exist almost completely of strands and loops.

This led us to believe that the Msp1 protein encodes another not-yet described enzymatic domain, responsible for the chitinase activity. Our hypothesis for the existence of another domain and accompanying activity is supported by a number of observations. Firstly, the NlpC/p60 domain only covers the C-terminal 113 amino acids of a 498 amino acid counting protein (SEQ ID NO: 3), leaving the first part of this gene available for additional domains. In this first part, we did find some structural similarity to known chitinases. Another parallel to be considered is that Msp1 can stimulate Akt signalling (Yan and Polk, 2002), which was also described for other chitin-binding proteins, for example Chitinase-3-like-1 protein (Chen et al., 2011). This would also imply that Msp1 is a bifunctional enzyme.

These observations found here also shed some additional light on a few other studies. In the study of Ettinger and colleagues, they found that *L. rhamnosus* GR-1 (which expresses the same Msp1/p75 protein than *L. rhamnosus* GG) could attenuate the induction of hypertrophy in cardiomyocytes. They hypothesised based on the known anti-apoptotic properties that this is due to the secretion of Msp1 (Ettinger et al., 2017), but could not confirm this. However, since they only used an insertional mutant of *L. rhamnosus* GR-1 (that also lacks the known enzymatic endo peptidase domain) and no purified Msp1, it can be considered that Msp1 is still the key effector of the observed activity. In our previous work regarding *L. rhamnosus* GG and its LTA mutant in a murine colitis model (Claes et al., 2011), Msp1 and Msp2 were put forward as anti-colitis molecules of *L. rhamnosus* GG because of their anti-inflammatory nature. More recently, it has been shown that the human chitinase-3-like-1 protein can down-regulate the pre-apoptotic proteins S100A8 and S100A9 (Low et al., 2015). These proteins are normally upregulated during colitis and crucial for the disease development. Possibly, the chitinase domain of Msp1 can also recognize the same site as the human chitinase-3-like-1 protein and exert the same activity on the expression of the pre-apoptotic protein S100A89.

REFERENCES

Chen C. C. et al. Carbohydrate-binding motif in chitinase 3-like 1 (CHI3L1/YKL-40) specifically activates Akt signaling pathway in colonic epithelial cells. Clin. Immunol.; 140(3): 268-75 (2011).

Claes, I. J. et al. Lessons from probiotic-host interaction studies in murine models of experimental colitis. Mol. Nutr. Food Res., 55(10): 1441-53 (2011).

Claes, I. J. et al. Genetic and biochemical characterization of the cell wall hydrolase activity of major secreted protein of *Lactobacillus rhamnosus* GG; Plos One 7(2): e31588 (2012).

Ettinger G., et al. *Lactobacillus rhamnosus* GR-1 attenuates induction of hypertrophy in cardiomyocytes but not through secreted protein Msp-1 (p75). Plos one; 12(1): e0168622 (2017).

Könönen, E. and Wade, W. G., *Actinomyces* and related organisms in human infections; Clin. Microbiol. Rev.; 28(2); 419-42 (2015).

Lebeer, S. et al. The major secreted protein Msp1/p75 is O-glycosylated in *Lactobacillus rhamnosus* GG. Microb. Cell Fact. 11, 15 (2012).

Lewis, K. Multidrug tolerance of biofilms and persister cells; Curr. Top. Microbiol. Immunol., 322: 107-311 (2008).

Low, D. et al. Chitinase 3-like 1 induces survival and proliferation of intestinal epithelial cells during chronic inflammation and colitis-associated cancer by regulating S100A9. Oncotarget, 6(34): 36535-50 (2015).

Olland, A. M. et al. Triad of polar residues implicated in pH specificity of acidic mammalian chitinase. Protein Sci., 18(3): 569-78 (2009).

Perrakis, A., et al. Crystal structure of a bacterial chitinase at 2.3 A resolution. Structure; 2(12): 1169-80 (1994).

Petrova, M. I. et al. Lectin-like molecules of *Lactobacillus rhamnosus* GG inhibit pathogenic *Escherichia coli* and *Salmonella* biofilm formation; Plos One 11, e0161337 (2016).

Tian, P. and Bernstein, H. D. Molecular basis for the structural stability of an enclosed beta-barrel loop. J. Mob. Biol; 402(2): 475-89 (2010).

Yachdav, G. et al. PredictProtein—an open resource for online prediction of protein structural and functional features. Nucleic Acids Res.; 42: W337-43 (2014).

Yan, F. and Polk, D. B. Probiotic bacterium prevents cytokine-induced apoptosis in intestinal epithelial cells. J. Biol. Chem., 277(52): 50959-65 (2002).

---

The invention claimed is:

1. A method of reducing and/or preventing hyphae formation in a hyphae-forming pathogen, the method comprising contacting the pathogen with a composition consisting of (i) an effective amount of a bifunctional peptidoglycan/chitin hydrolase purified from a supernatant of a Lactobacilliae strain, and (ii) lactic acid, wherein the bifunctional peptidoglycan/chitin hydrolase is major secreted protein 1 (Msp1), and wherein the pathogen contacts the Msp1 and lactic acid.

2. The method according to claim 1, wherein the bifunctional peptidoglycan/chitin hydrolase comprises at least 70% sequence homology to SEQ ID NO: 1.

3. The method according to claim 1, wherein the bifunctional peptidoglycan/chitin hydrolase comprises at least 70% sequence homology to SEQ ID NO: 3.

4. The method according to claim 1, wherein the Lactobacillaceae strain selected from the group consisting of *Lacticaseibacillus rhamnosus*, *Lacticaseibacillus casei*, *Lacticaseibacillus paracasei*, and *Limosilactobacillus fermentum*.

5. The method according to claim 1, wherein the hyphae-forming pathogen is selected from a yeast or a bacterium.

6. The method according to claim 1, wherein the composition has a pH lower than 7.

7. The method according to claim 1, wherein the bifunctional peptidoglycan/chitin hydrolase is an anti-fungal agent.

8. A method of treating and/or preventing a hyphae-forming pathogenic infection in a subject in need thereof, the method comprising treating the subject with a composition consisting of (i) an effective amount of a bifunctional peptidoglycan/chitin hydrolase purified from a supernatant of a *Lactobacilliae* strain, and (ii) lactic acid, wherein the bifunctional peptidoglycan/chitin hydrolase is major secreted protein (Msp1).

9. The method according to claim 8, wherein the subject is a human or an animal.

10. The method according to claim 8, wherein the bifunctional peptidoglycan/chitin hydrolase comprises at least 70% sequence homology to SEQ ID NO: 1.

11. The method according to claim 8, wherein the bifunctional peptidoglycan/chitin hydrolase comprises at least 70% sequence homology to SEQ ID NO: 3 and has hydrolase activity.

12. The method according to claim 8, wherein the *Lactobacilloeae* strain is selected from the group consisting of *Lacticaseibacillus rhamnosus*, *Lacticaseibacillus casei*, *Lacticaseibacillus paracasei*, and *Limosilactobacillus fermentum*.

13. The method according to claim 8, wherein the hyphae-forming pathogenic infection is selected from a yeast infection and a bacterial infection.

14. The method according to claim 8, wherein the composition has a pH lower than 7.

15. A method of reducing and/or preventing hyphae formation in a hyphae-forming pathogen, the method comprising contacting the pathogen with a composition consisting of an effective amount of major secreted protein 1 (Msp1) and lactic acid, wherein the Msp1 is purified from a supernatant of a *Lactobacilliae* strain.

16. A method of reducing and/or preventing hyphae formation in a hyphae- forming pathogen, the method comprising contacting the pathogen with a composition consisting of (i) an effective amount of a bifunctional peptidoglycan/chitin hydrolase purified from a supernatant of a *Lactobacillaceae* strain, (ii) lactic acid and a *Lactobacillaceae* strain selected from the group consisting of: *Lacticaseibacillus rhamnosus*, *Lacticaseibacillus casei*, *Lacticaseibacillus paracasei*, and *Limosilactobacillus fermentum*, wherein the bifunctional peptidoglycan/chitin hydrolase is major secreted protein 1 (Msp1), and wherein the pathogen contacts the Msp1 and lactic acid.

* * * * *